(12) United States Patent
Patel et al.

(10) Patent No.: US 10,880,067 B2
(45) Date of Patent: Dec. 29, 2020

(54) DOWNLINK CONTROL ALLOCATION USING CARRIER AGGREGATION RESOURCE GROUPS

(71) Applicant: QUALCOMM Incorporated, San Diego, CA (US)

(72) Inventors: Shimman Arvind Patel, San Diego, CA (US); Seyedkianoush Hosseini, San Diego, CA (US); Heechoon Lee, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/976,079

(22) Filed: May 10, 2018

(65) Prior Publication Data

US 2018/0331813 A1 Nov. 15, 2018

Related U.S. Application Data

(60) Provisional application No. 62/505,659, filed on May 12, 2017.

(51) Int. Cl.
*H04L 5/00* (2006.01)
*H04W 72/04* (2009.01)

(52) U.S. Cl.
CPC ........... *H04L 5/0098* (2013.01); *H04L 5/001* (2013.01); *H04L 5/0044* (2013.01);
(Continued)

(58) Field of Classification Search
CPC .... H04L 5/001; H04L 5/0098; H04W 72/042; H04W 72/0453
See application file for complete search history.

(56) References Cited

U.S. PATENT DOCUMENTS

| 8,942,199 B2 * | 1/2015 | Nakao | H04L 5/001 |
| | | | 370/329 |
| 2012/0269152 A1 * | 10/2012 | Hong | H04L 5/0094 |
| | | | 370/329 |

(Continued)

FOREIGN PATENT DOCUMENTS

WO WO-2011074817 A2 6/2011

OTHER PUBLICATIONS

Qualcomm Incorporated: "Downlink Design for Shortened TTI", 3GPP TSG RAN WG1 #86, R1-166309, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 13, 2016, XP051132725, Retrieved from the Internet: URL:http://www.3gpp.org/ftp/tsg_ran/WG1_RL1/TSGR1_86/Docs/, 14 pages.

(Continued)

*Primary Examiner* — Mansour Oveissi
(74) *Attorney, Agent, or Firm* — Holland & Hart LLP/Qualcomm

(57) ABSTRACT

Methods, systems, and devices for wireless communication are described that provide allocation of wireless resources for UEs in carrier aggregation resource groups that span two or more component carriers (CCs). A carrier aggregation resource group may include a portion of available wireless resources in two or more CCs, and multiple carrier aggregation resource groups may be configured that may include resources that span overlapping or non-overlapping CCs. Downlink control information may be transmitted using a downlink control region that spans two or more CCs in a carrier aggregation resource group. A UE may be configured to monitor multiple CCs for downlink control information, such as through blind decodes of each CC that may contain downlink control information.

30 Claims, 21 Drawing Sheets

Low Latency TTIs

(52) U.S. Cl.
CPC .......... *H04L 5/0053* (2013.01); *H04L 5/0094* (2013.01); *H04W 72/0453* (2013.01); *H04W 72/042* (2013.01)

(56) References Cited

U.S. PATENT DOCUMENTS

| | | | |
|---|---|---|---|
| 2013/0258868 A1* | 10/2013 | Davis | H04B 7/0689 370/252 |
| 2016/0128095 A1* | 5/2016 | Damnjanovic | H04L 5/0087 370/336 |
| 2016/0227523 A1 | 8/2016 | Desai et al. | |
| 2017/0013618 A1 | 1/2017 | Shin | |
| 2017/0230994 A1* | 8/2017 | You | H04L 5/0053 |
| 2018/0049175 A1 | 2/2018 | Bagheri et al. | |
| 2018/0049197 A1 | 2/2018 | Patel et al. | |
| 2018/0049226 A1 | 2/2018 | Chen et al. | |

OTHER PUBLICATIONS

Huawei, et al., "Discussion on CA Issues for Shortened TTI Operation," 3GPP Draft; R1-1608653, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 1, 2016, XP051159009, 4 Pages, and Retrieved from the Internet: URL: http://www.3gpp.org/ftp/tsg_ran/WG1/_RL1/TSGR1_86b/Docs/ [retrieved on Oct. 1, 2016].
International Search Report and Written Opinion—PCT/US2018/032398—ISA/EPO—dated Sep. 5, 2018 (174196WO).
Media Tek Inc, "sPDCCH Design", R1-1705462, 3GPP TSG RAN WG1 Meeting #88bis, Spokane, USA, Apr. 3-7, 2017, pp. 1-6.

* cited by examiner

DOWNLINK CONTROL ALLOCATION USING CARRIER AGGREGATION RESOURCE GROUPS

CROSS REFERENCES

The present Application for Patent claims priority to U.S. Provisional Patent Application No. 62/505,659 by Patel, et al., entitled "Downlink Control Allocation Using Carrier Aggregation Resource Groups," filed May 12, 2017, assigned to the assignee hereof.

BACKGROUND

The following relates generally to wireless communication, and more specifically to downlink control allocation using carrier aggregation resource groups.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station in some LTE or NR deployments may transmit downlink transmissions to one or more UEs, and the one or more UEs may transmit uplink transmissions back to the base station. In some cases, a base station may transmit to one or more UEs using a transmission time interval (TTI) that is reduced in length relative to other TTIs that may be configured. Such a TTI may be referred to as a shortened TTI (sTTI) and users receiving an sTTI may be using a low latency service provided by the LTE or NR network. In some cases, multiple component carriers may be configured for communications between a base station and one or more UEs. Efficient communications using sTTI resources across multiple component carriers for one or more UEs may be desirable in order to preserve the relatively few sTTI resources that are available for low latency communications.

SUMMARY

The described techniques relate to improved methods, systems, devices, or apparatuses that support downlink control allocation using carrier aggregation resource groups. Generally, the described techniques provide for allocation of wireless resources for UEs in carrier aggregation resource groups that span two or more component carriers (CCs). In some cases, a carrier aggregation resource group may include a portion of available wireless resources in two or more CCs, and multiple carrier aggregation resource groups may be configured that may include resources that span overlapping or non-overlapping CCs. In some cases, downlink control information may be transmitted using a downlink control region that spans two or more CCs in a carrier aggregation resource group. In some cases, a UE may be configured to monitor multiple CCs for downlink control information. Such a UE may blindly decode portions of each CC that may contain downlink control information, for example. In some cases, the downlink control information may be transmitted at a relatively high aggregation level across multiple CCs, which may enhance the reliability of the UE successfully receiving the downlink control information.

A method of wireless communication is described. The method may include receiving signaling from a base station that indicates resources in at least a first component carrier and a second component carrier are allocated to a first carrier aggregation resource group, receiving, over the first component carrier, a first portion of control information, receiving, over the second component carrier, a second portion of the control information, and determining a resource grant based at least in part on both the first portion of the control information and the second portion of the control information. The resource grant may comprise an allocation of resources for shared channel transmission from one or more component carriers allocated to the first carrier aggregation resource group.

An apparatus for wireless communication is described. The apparatus may include means for receiving signaling from a base station that indicates resources in at least a first component carrier and a second component carrier are allocated to a first carrier aggregation resource group, means for receiving, over the first component carrier, a first portion of control information, means for receiving, over the second component carrier, a second portion of the control information, and means for determining a resource grant based at least in part on both the first portion of the control information and the second portion of the control information. The resource grant may comprise an allocation of resources for shared channel transmission from one or more component carriers allocated to the first carrier aggregation resource group.

Another apparatus for wireless communication is described. The apparatus may include a processor, memory in electronic communication with the processor, and instructions stored in the memory. The instructions may be operable to cause the processor to receive signaling from a base station that indicates resources in at least a first component carrier and a second component carrier are allocated to a first carrier aggregation resource group, receive, over the first component carrier, a first portion of control information, receive, over the second component carrier, a second portion of the control information, and determine a resource grant based at least in part on both the first portion of the control information and the second portion of the control information. The resource grant may comprise an allocation of resources for shared channel transmission from one or more component carriers allocated to the first carrier aggregation resource group.

A non-transitory computer readable medium for wireless communication is described. The non-transitory computer-readable medium may include instructions operable to cause a processor to receive signaling from a base station that indicates resources in at least a first component carrier and a second component carrier are allocated to a first carrier aggregation resource group, receive, over the first component carrier, a first portion of control information, receive, over the second component carrier, a second portion of the control information, and determine a resource grant based at least in part on both the first portion of the control information and the second portion of the control information. The resource grant may comprise an allocation of resources for shared channel transmission from one or more component carriers allocated to the first carrier aggregation resource group.

Some examples of the method, apparatus, and non-transitory computer-readable medium described above may further include processes, features, means, or instructions for identifying a control region in the first carrier aggregation resource group. Some examples of the method, apparatus, and non-transitory computer-readable medium described above may further include processes, features, means, or instructions for blindly decoding the identified control region, and wherein the receiving the first portion of the control information and the second portion of the control information may be based at least in part on successfully blind decoding the first portion of control information and the second portion of the control information.

In some examples of the method, apparatus, and non-transitory computer-readable medium described above, the determining the resource grant comprises identifying a shared channel resource allocation of at least the first component carrier and the second component carrier allocated to the first carrier aggregation resource group. In some examples of the method, apparatus, and non-transitory computer-readable medium described above, the signaling from the base station indicates that the first carrier aggregation resource group and a second carrier aggregation resource group are to be monitored for control information, and the resource grant indicates that shared channel resources are allocated in the first carrier aggregation resource group, the second carrier aggregation resource group, and a third carrier aggregation resource group.

In some examples of the method, apparatus, and non-transitory computer-readable medium described above, the resource grant comprises one or more aggregation bits that indicate that shared channel transmissions in at least the first carrier aggregation resource group and a second carrier aggregation resource group are to be aggregated. In some cases, the second carrier aggregation resource group may comprise at least one component carrier in common with the first carrier aggregation resource group and at least one component carrier that is not allocated to the first carrier aggregation resource group. In some examples of the method, apparatus, and non-transitory computer-readable medium described above, the signaling from the base station may be radio resource control (RRC) signaling.

In some examples of the method, apparatus, and non-transitory computer-readable medium described above, the first carrier aggregation resource group comprises a first block of resources from the first component carrier, and the first portion of control information comprises a first subset of resources of the first block of resources and a second block of resources from the second component carrier, and the second portion of control information comprises a second subset of resources of the second block of resources. In some examples of the method, apparatus, and non-transitory computer-readable medium described above, the allocation of resources for shared channel transmission may comprise resources from the first component carrier, and the first portion of the control information may comprise a subset of resources that are localized or distributed within the allocation of resources for shared channel transmission resources.

In some examples of the method, apparatus, and non-transitory computer-readable medium described above, one or more of the first portion of the control information or the second portion of the control information includes a downlink control information portion and an uplink control information portion, and one or more rate-matching bits in the downlink control information portion indicate that all or a portion of the control information are to be reused for shared channel transmissions. In some examples of the method, apparatus, and non-transitory computer-readable medium described above, the first portion of the control information and the second portion of the control information may be aggregated according to a largest available aggregation size of the first component carrier and the second component carrier.

Some examples of the method, apparatus, and non-transitory computer-readable medium described above may further include processes, features, means, or instructions for receiving radio resource control signaling indicating that the second component carrier is deactivated. Some examples of the method, apparatus, and non-transitory computer-readable medium described above may further include processes, features, means, or instructions for disregarding resources associated with the second component carrier that may be included in the first carrier aggregation resource group.

Some examples of the method, apparatus, and non-transitory computer-readable medium described above may further include processes, features, means, or instructions for receiving radio resource control signaling indicating that a third component carrier is activated. Some examples of the method, apparatus, and non-transitory computer-readable medium described above may further include processes, features, means, or instructions for identifying allocated resources in the third component carrier that are included in the first carrier aggregation resource group. Some examples of the method, apparatus, and non-transitory computer-readable medium described above may further include processes, features, means, or instructions for receiving, over the third component carrier, a third portion of the control information over a third subset of the allocated resources.

A method of wireless communication is described. The method may include allocating resources in at least a first component carrier and a second component carrier for a first carrier aggregation resource group, transmitting signaling to a UE that indicates the first carrier aggregation resource group and resources in at least the first component carrier and the second component carrier allocated to the first carrier aggregation resource group, providing configuration information for the UE to monitor a first subset of the allocated resources on the first component carrier for a first portion of control information and to monitor a second subset of the allocated resources on the second component carrier for a second portion of the control information, allocating shared channel resources in the within the carrier aggregation resource group to the UE for shared channel transmissions, and transmitting an indication of the allocated shared channel resources to the UE in the first portion of the control information and the second portion of the control information.

An apparatus for wireless communication is described. The apparatus may include means for allocating resources in at least a first component carrier and a second component carrier for a first carrier aggregation resource group, means for transmitting signaling to a UE that indicates the first carrier aggregation resource group and resources in at least the first component carrier and the second component carrier allocated to the first carrier aggregation resource group, means for providing configuration information for the UE to monitor a first subset of the allocated resources on the first component carrier for a first portion of control information and to monitor a second subset of the allocated resources on the second component carrier for a second portion of the control information, means for allocating shared channel resources in the within the carrier aggregation resource group to the UE for shared channel transmissions, and means for transmitting an indication of the allocated shared channel resources to the UE in the first portion of the control information and the second portion of the control information.

Another apparatus for wireless communication is described. The apparatus may include a processor, memory in electronic communication with the processor, and instructions stored in the memory. The instructions may be operable to cause the processor to allocate resources in at least a first component carrier and a second component carrier for a first carrier aggregation resource group, transmit signaling to a UE that indicates the first carrier aggregation resource group and resources in at least the first component carrier and the second component carrier allocated to the first carrier aggregation resource group, provide configuration information for the UE to monitor a first subset of the allocated resources on the first component carrier for a first portion of control information and to monitor a second subset of the allocated resources on the second component carrier for a second portion of the control information, allocate shared channel resources in the within the carrier aggregation resource group to the UE for shared channel transmissions, and transmit an indication of the allocated shared channel resources to the UE in the first portion of the control information and the second portion of the control information.

A non-transitory computer readable medium for wireless communication is described. The non-transitory computer-readable medium may include instructions operable to cause a processor to allocate resources in at least a first component carrier and a second component carrier for a first carrier aggregation resource group, transmit signaling to a UE that indicates the first carrier aggregation resource group and resources in at least the first component carrier and the second component carrier allocated to the first carrier aggregation resource group, provide configuration information for the UE to monitor a first subset of the allocated resources on the first component carrier for a first portion of control information and to monitor a second subset of the allocated resources on the second component carrier for a second portion of the control information, allocate shared channel resources in the within the carrier aggregation resource group to the UE for shared channel transmissions, and transmit an indication of the allocated shared channel resources to the UE in the first portion of the control information and the second portion of the control information.

In some examples of the method, apparatus, and non-transitory computer-readable medium described above, the signaling identifies a control region in each of the first component carrier and the second component carrier for blind decoding at the UE. In some examples of the method, apparatus, and non-transitory computer-readable medium described above, the allocated shared channel resources comprise shared channel resource allocations in one or more of the carrier aggregation resource groups.

In some examples of the method, apparatus, and non-transitory computer-readable medium described above, the signaling indicates the first carrier aggregation resource group and a second carrier aggregation resource group are to be monitored for control information, and the allocated shared channel resources may be allocated in the first carrier aggregation resource group, the second carrier aggregation resource group, and a third carrier aggregation resource group. In some examples of the method, apparatus, and non-transitory computer-readable medium described above, the signaling comprises one or more aggregation bits that indicate that shared channel transmissions in two or more carrier aggregation resource groups are to be aggregated. In some examples of the method, apparatus, and non-transitory computer-readable medium described above, the signaling may be RRC signaling. Some examples of the method, apparatus, and non-transitory computer-readable medium described above may further include processes, features, means, or instructions for determining a channel condition or error rate associated with the first component carrier. In some examples of the method, apparatus, and non-transitory computer-readable medium described above, the providing configuration information for the UE to monitor the first subset of the allocated resources on the first component carrier for the first portion of control information and to monitor the second subset of the allocated resources on the second component carrier for the second portion of the control information may be based at least in part the determining the channel condition or error rate.

In some examples of the method, apparatus, and non-transitory computer-readable medium described above, the carrier aggregation resource group comprises a first block of resources from the first component carrier, and the first portion of control information comprises a first subset of resources of the first block of resources, and a second block of resources from the second component carrier, and the second portion of control information comprises a second subset of resources of the second block of resources. In some examples of the method, apparatus, and non-transitory computer-readable medium described above, the allocated resources for shared channel transmission may comprise resources from the first component carrier, and the first portion of the control information may comprise a subset of resources that are localized or distributed within the allocated resources for shared channel transmission resources.

In some examples of the method, apparatus, and non-transitory computer-readable medium described above, one or more of the first portion of the control information or the second portion of the control information includes a downlink control information portion and an uplink control information portion, and one or more rate-matching bits in the downlink control information portion indicate that all or a portion of the control information are to be reused for shared channel transmissions. In some examples of the method, apparatus, and non-transitory computer-readable medium described above, the first portion of the control information and the second portion of the control information may be aggregated according to a largest available aggregation size of the first component carrier and the second component carrier.

Some examples of the method, apparatus, and non-transitory computer-readable medium described above may further include processes, features, means, or instructions for transmitting radio resource control signaling indicating that the second component carrier is deactivated. Some examples of the method, apparatus, and non-transitory computer-readable medium described above may further include processes, features, means, or instructions for discontinuing transmissions using resources associated with the second component carrier that may be included in the carrier aggregation resource group. Some examples of the method, apparatus, and non-transitory computer-readable medium described above may further include processes, features, means, or instructions for transmitting radio resource control signaling indicating that a third component carrier is activated. Some examples of the method, apparatus, and non-transitory computer-readable medium described above may further include processes, features, means, or instructions for identifying allocated resources in the third component carrier that are included in the carrier aggregation resource group. Some examples of the method, apparatus, and non-transitory computer-readable medium described above may further include processes, features, means, or instructions for transmitting, over the third component carrier, a third portion of the control information over a third subset of the allocated resources.

DETAILED DESCRIPTION

Figure 1:
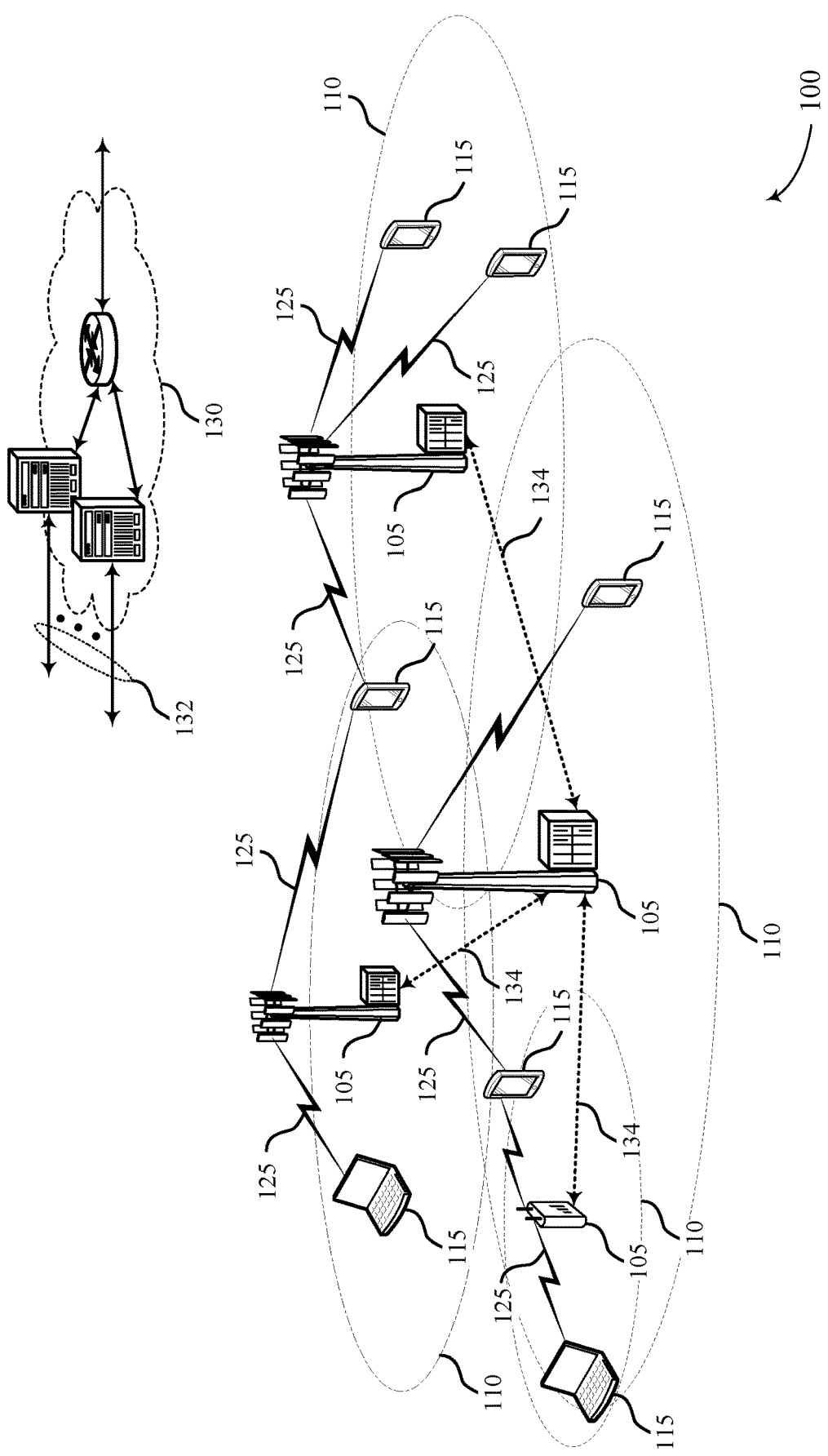
FIG. 1 illustrates an example of a system for wireless communication that supports downlink control allocation using carrier aggregation resource groups in accordance with aspects of the present disclosure.

Control channels for low latency transmissions may be designed, mapped, and communicated to enhance reliability and availability of resources for low latency data channels. In some cases, downlink control information may be transmitted using two or more component carriers (CCs), which may enhance the reliability of successful user equipment (UE) reception of the control information. Control channels with the control information, as well as data channels, may be transmitted using reduced length transmission time intervals (TTIs) (e.g., including a shortened TTI (sTTI)), and may encounter a number of challenges, including the need to efficiently support multiple low latency users, support multiple CC scheduling, as well as support legacy users. Downlink control channel information may be transmitted using carrier aggregation resource groups to one or more UEs across one or more CCs, according to techniques as discussed herein.

In some cases, a carrier aggregation resource group may include a portion of available wireless resources in two or more CCs, and multiple carrier aggregation resource groups may be configured that may include resources that span overlapping or non-overlapping CCs. In some cases, downlink control information may be transmitted using a downlink control region that spans two or more CCs in a carrier aggregation resource group. In some cases, a UE may be configured to monitor multiple CCs for downlink control information. Such a UE may blindly decode portions of each CC that may contain downlink control information. In some cases, the downlink control information may be transmitted at a relatively high aggregation level across multiple CCs, which may enhance the reliability of the UE successfully receiving the downlink control information.

Resources allocated for low latency communication may be used for uplink and downlink communication using sTTIs that, as indicated above, have a reduced length relative to TTIs of communications that may be relatively latency insensitive, such as enhanced mobile broadband (eMBB) transmissions that may use a 1 ms TTI duration. Communications using sTTIs may use, in some cases, a TTI duration that corresponds to one slot of a wireless subframe, or a TTI duration that corresponds to two or three orthogonal frequency division multiplexing (OFDM) symbols. In some cases, TTIs may be configured to have boundaries within or aligned with boundaries of a slot of a 1 ms TTI. In some examples, the TTIs may span two or three OFDM symbols, and each slot may have three TTIs. In such a manner, all seven symbols of a slot using a normal cyclic prefix may be utilized and system resources may be efficiently utilized.

Low latency communications using sTTIs may be used in systems, for example, that may support multiple different services for data communications. Different services may be selected depending upon the nature of the communications. For example, communications that require low latency and high reliability, sometimes referred to as mission critical (MiCr) communications, may be served through a lower-latency service (e.g., a URLLC service) that uses shortened TTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

Aspects of the disclosure are initially described in the context of a wireless communications system. Aspects of the disclosure are further illustrated by and described with reference to apparatus diagrams, system diagrams, and flowcharts that relate to downlink control allocation using carrier aggregation resource groups.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some cases, UEs 115 and base stations 105 may use carrier aggregation resource groups for control channel transmissions, data channel transmissions, or combinations thereof.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base stations 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected CCs using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

As indicated above, a base station 105 may communicate with one or more of UEs 115 using low latency transmissions, for example using sTTIs. An sTTI may be divided into a number of resource blocks, one or more of which may include a control region. The control region may include downlink grants for one or more a low latency UEs 115 on one or more CCs, and may indicate a data region of the resource block of the one or more CCs for the UE(s) 115 to receive data. In some cases, the control region may span two or more CCs in a carrier aggregation resource group. A carrier aggregation resource group may include a portion of available wireless resources in two or more CCs, and multiple carrier aggregation resource groups may be configured that may include resources that span overlapping or non-overlapping CCs. In some cases, a UE 115 may be configured to monitor multiple CCs for downlink control information. For example, a UE 115 may be configured to monitor shortened physical downlink control channel (sPDCCH) resources that are configured in one or more carrier aggregation resource groups and portions of which may be located on different CCs.

A UE 115 may perform blind decoding on the configured sPDCCH resources to attempt to decode sPDCCH transmissions. In some cases, sPDCCH transmissions may be transmitted only on a single CC within the carrier aggregation resource group. In other cases, a base station may determine that channel conditions of a UE 115 on a particular CC may be relatively poor, and the base station 105 may transmit the control information over two or more CCs, which may increase the likelihood of the UE 115 successfully receiving the control information. In some cases, the downlink control information may be transmitted at a relatively high aggregation level across the multiple CCs, which may enhance the likelihood of the UE successfully receiving the downlink control information In some examples, a carrier aggregation resource group may include control resources that may include, for example, a sPDCCH transmission that may include an indication of portions of the sPDCCH that may be reallocated for data transmissions within the control resources. The reallocated data region of the control resources may be for a physical downlink shared channel (PDSCH) transmission, for example, transmitted by a base station 105. The control resources may include a control message that has grants of downlink and/or uplink resources of the CC(s) for the UE 115. A UE 115 that receives the downlink grant in the sPDCCH may identify the data region of one or more TTIs, which may include uplink/downlink grants on one or more CCs. In some examples, data transmissions within the sPDCCH may be rate matched around the uplink/downlink grants of carrier access resource group. In some examples, the sPDCCH may include an indication (e.g., a field made up of a number of bits to provide a mapping of a PDSCH data area of the carrier aggregation resource group) to inform the UE 115 of portions of the carrier aggregation resource group allocated for data transmissions during a sTTI.

In addition to downlink grants for multiple UEs 115 and/or CCs, an sPDCCH transmission in a carrier aggregation resource group may include one or more uplink grants for one or more UEs 115 and/or CCs. In some cases, the downlink grants may be at the beginning of the control region, and the one or more uplink grants may be at the end of the control region. A UE 115 may blindly decode the beginning of the control region according to multiple possible starting locations and aggregation levels to identify a downlink grant. The size of the control region may be large enough so that, for the different possible aggregation levels, uplink grants and the downlink grant do not overlap in the control region. An unused portion of the control region, for example for lower aggregation levels, may be reallocated for PDSCH transmissions. An indication of the start of the uplink grants may be provided in the downlink grant of the control region so that, in conjunction with knowledge by the UE 115 of the end of its downlink grant, UE 115 may identify the data region within the sPDCCH.

Figure 2:
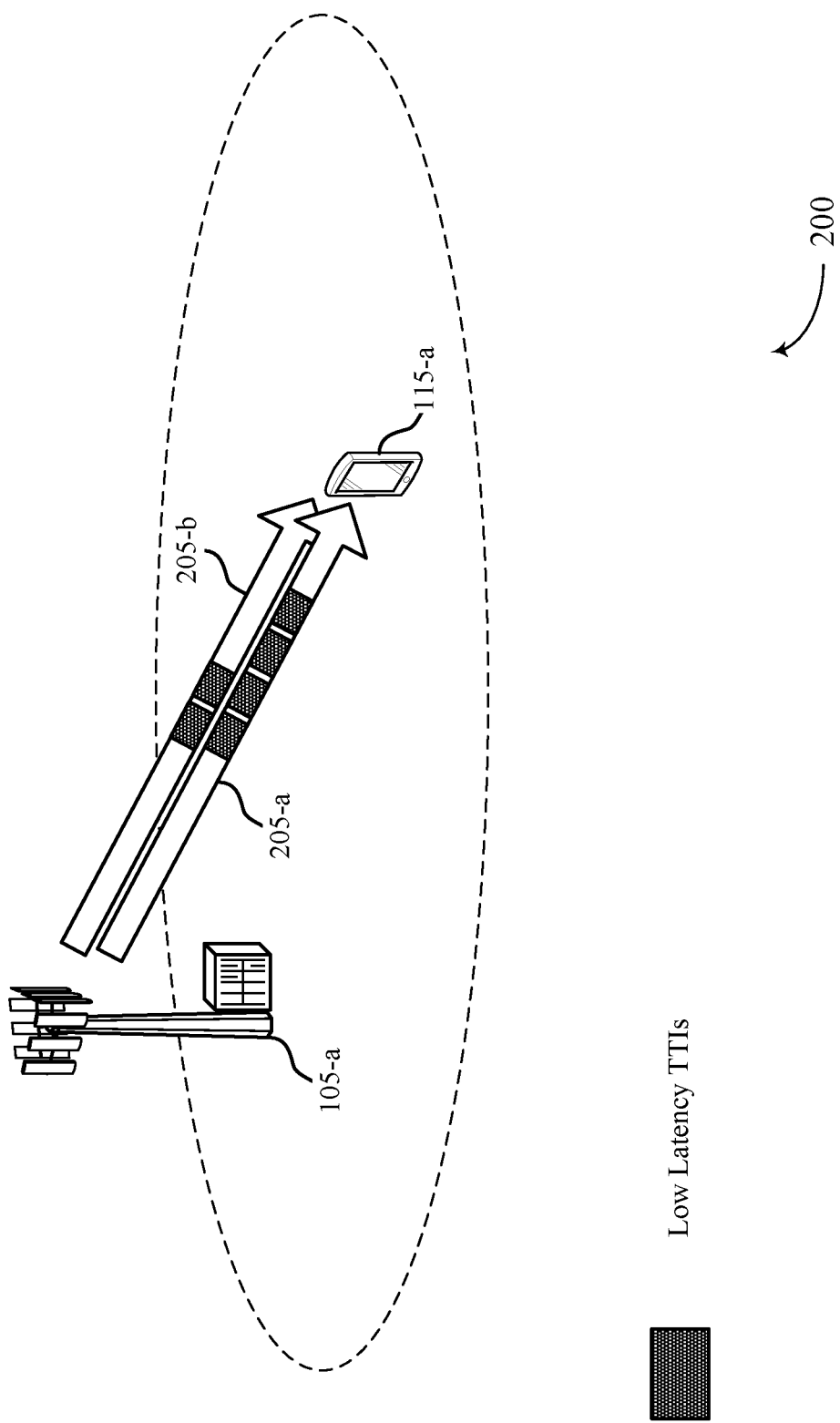
FIG. 2 illustrates an example of a wireless communications system that supports downlink control allocation using carrier aggregation resource groups in accordance with aspects of the present disclosure.

FIG. 2 illustrates an example of a wireless communications system 200 that supports downlink control allocation using carrier aggregation resource groups in accordance with various aspects of the present disclosure. Wireless communications system 200 includes one or more base stations 105-a and a UE 115-a, which may be examples of aspects of a base station 105 and a UE 115 as described with reference to FIG. 1. Base station 105-a may transmit resource allocations and other control information in control information resources, which may include one or more sPDCCH transmissions, for example, to UE 115-a using one or more carrier aggregation resource groups. The resource allocations may include one or both of downlink grants and uplink grants of resources for transmission of downlink data (e.g., in an sPDSCH) and uplink data (e.g., in a sPUSCH) for UE 115-a. Wireless communications system 200 may support carrier aggregation, and a first CC 205-a and a second CC 205-b may be transmitted to the UE 115-a and a carrier aggregation resource group may include wireless resources that span the two or more CCs 205.

A carrier aggregation resource group may have multiple resource blocks in multiple CCs 205, which may span the whole system bandwidth or a portion of the system bandwidth. The resource blocks may have the same or different sizes in frequency and the same or different sizes in each of the two or more CCs 205. Each resource block may be allocated for a single user or multiple users. The users may access one, multiple, or all of the resource blocks of the carrier aggregation resource groups, depending on a configuration. The resource block structure used may be defined by higher level signaling, for example for a semi-static configuration communicated via RRC signaling.

A carrier aggregation resource group may have an sPDCCH associated therewith, which may be embedded within one or more resource block on one or more CCs 205. The sPDCCH may be at the beginning of the resource block (e.g., in the first one or more symbols of the resource block) to enable early decoding of the sPDCCH in the resource block. The sPDCCH may span the bandwidth of the resource block, or may occupy less than the full bandwidth of each resource block, with additional signaling included above (e.g., at a higher frequency) and/or below (e.g., at a lower frequency) the resource elements occupied by the sPDCCH in the resource block of each CC 205.

Figure 3:
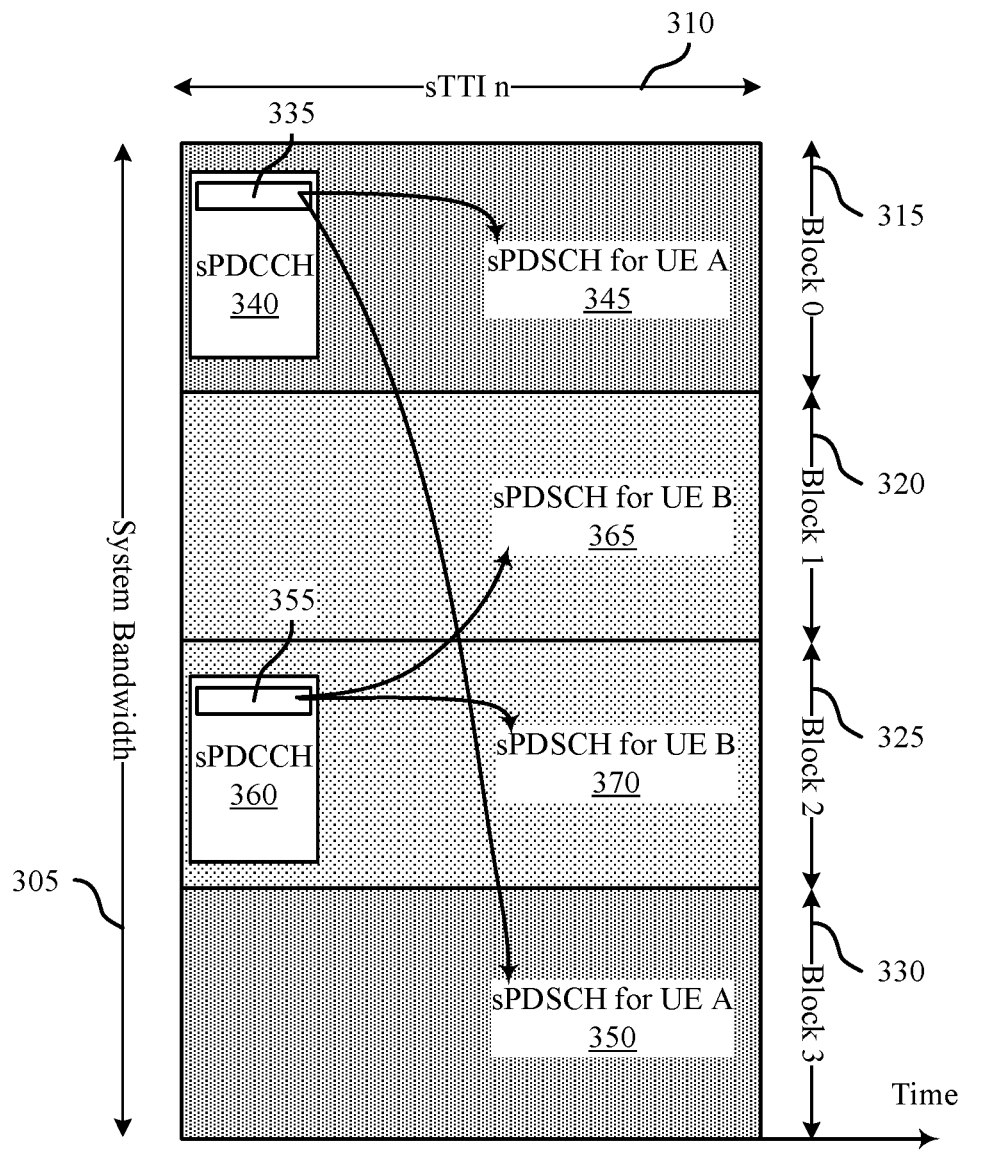
FIG. 3 illustrates an example of control information resources that support downlink control allocation using carrier aggregation resource groups in accordance with aspects of the present disclosure.

FIG. 3 illustrates an example of control information resources 300 that support downlink control allocation using carrier aggregation resource groups in accordance with various aspects of the present disclosure. Control information resources 300 include an sTTI 310 having a system bandwidth 305. The sTTI 310 may represent a sTTI within a legacy TTI, or a separate TTI. In some examples, and as may be the case with other sTTI described here, sTTI 310 may be of different durations, for example a single symbol period, two symbol periods, a single slot width associated with a legacy TTI, etc. In this example, sTTI 310 includes four resource blocks: resource block 315 and resource block 330 for UE A, and resource block 320 and resource block 325 for UE B. Each resource block 315 through 325 may include wireless resources from one or more CCs and may be transmitted in one or more carrier aggregation resource groups.

In cases where one or more carrier aggregation resource groups are used to transmit resource blocks 315 through 325 over two or more CCs, a UE may combine the associated resource from the one or more CCs according to the carrier aggregation resource group configuration to obtain a resource block, such as resource block 315. A base station 105 may generate a downlink grant 335 to be included in an sPDCCH 340, the control region of resource block 315. The sPDCCH 340 may be, for example, in a first symbol period of the resource block 315. The downlink grant 335 may be for an sPDSCH 345 in a data region of the resource block 315 that contains the downlink grant. The downlink grant may also be for a second sPDSCH, sPDSCH 350, in a data region of resource block 330 that are also for UE A, to be jointly used to receive data at UE A based on the control information of downlink grant 335. A base station 105 may also generate a second downlink grant 355 to be included in an sPDCCH 360, the control region of resource block 325. The second downlink grant 355 may be for the sPDSCH 370 of the resource block 325, and may also be for the sPDSCH for resource block 320.

For both downlink grants, one or more bits in each of downlink grant 335 and second downlink grant 355 may be generated by a transmitting based station 105 to indicate other resource blocks of the sTTI that include an sPDCCH for that same low latency user. In this example, sTTI 310 includes four resource blocks. Downlink grant 335 for a UE A may thus include three bits to indicate whether the downlink grant 335 is for any of the other three resource blocks for UE A.

The above-described procedure may efficiently indicate downlink grants at least in part because a low latency user may only need to perform a blind decode in a fixed position of each CC having resources in the carrier aggregation resource group, and a number of blind decodes used to determine the downlink grant may be limited to a number of CCs and associated resource blocks configured by a base station (e.g., cell).

Figure 4:
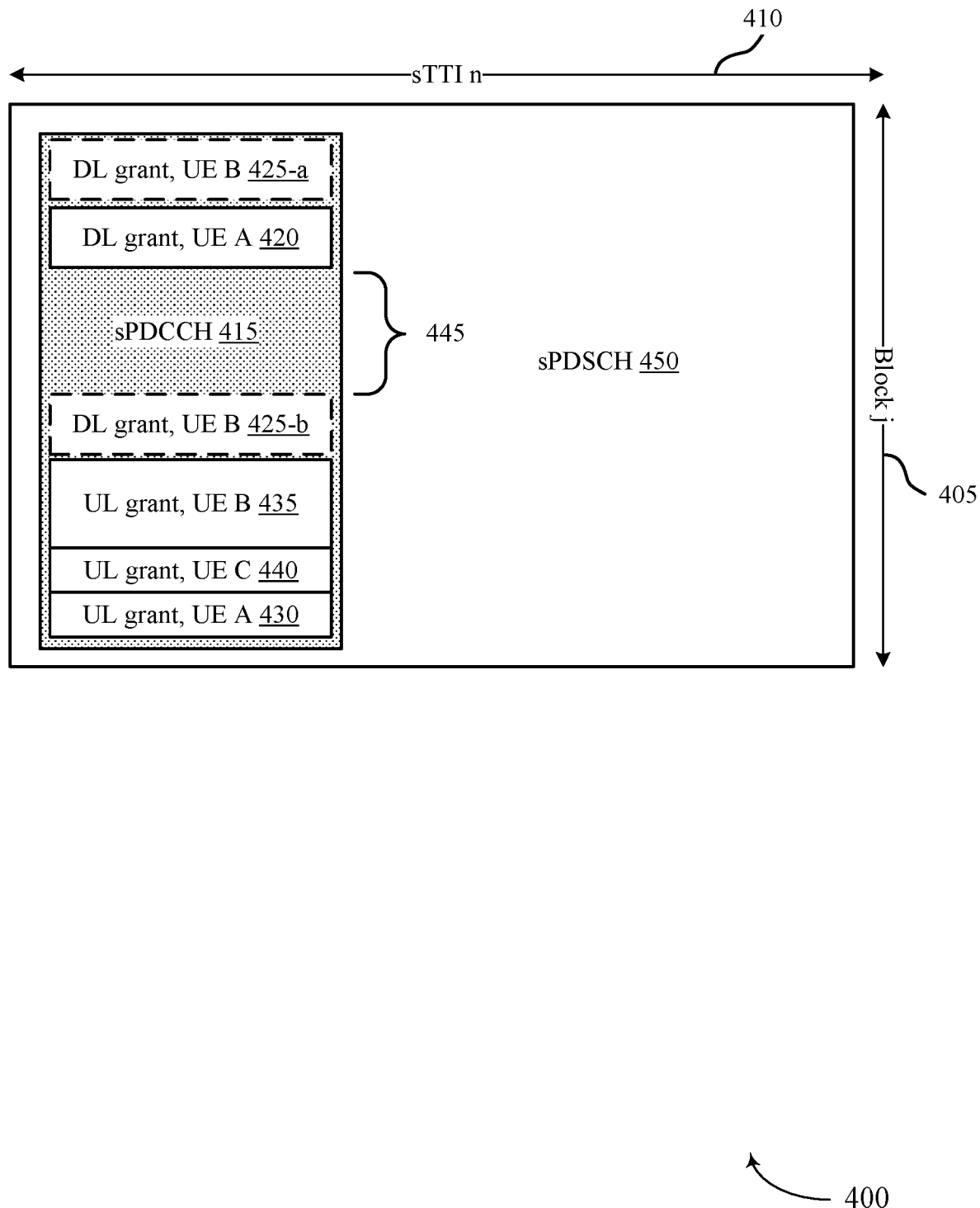
FIG. 4 illustrates an example of a control information format that supports downlink control allocation using carrier aggregation resource groups in accordance with aspects of the present disclosure.

FIG. 4 illustrates an example of a control information format 400 that supports downlink control allocation using carrier aggregation resource groups in accordance with various aspects of the present disclosure. In some examples, control information format 400 may implement aspects of wireless communications system 100. In the example of FIG. 4, control information format 400 shows a resource block 405 for a sTTI 410, where the resource block 405 includes a control region including sPDCCH 415 and a data region including sPDSCH 450 for UE-A that is indicated by sPDCCH 415. Similarly as discussed above, the resource block 405 may be formed from multiple sub-blocks that may each be transmitted on different CCs in one or more carrier aggregation resource groups.

The sPDCCH 415 may be or include one or more aspects of sPDCCH 340 or sPDCCH 360 as discussed above. The sPDCCH 415 of this example includes at least one downlink grant 420 for a UE-A, and at least one downlink grant 425 for UE-B (or one or more other UEs) on one or more CCs. In some cases, a downlink grant 425-a for UE-B (on a same or different CC) may be located at a beginning of the sPDCCH 415, ahead of the downlink grant 420 for UE-A. In other examples, downlink grant 425-b for UE-B may be after the downlink grant 420 for UE-A but ahead of one or more uplink grants 430 through 440. Some examples of an sPDCCH 415 may include one more uplink grants for one or more UEs, which may also include an uplink grant 430 for UE-A. The example of control information format 400 includes uplink grant 430 for UE-A, uplink grant 435 for UE-B, uplink grant 440 for UE-C, in which the uplink grant 435 for UE-B and the uplink grant 440 for UE-C may be on a same or different carrier aggregation resource group(s).

In examples where a downlink grant 420 for UE-A may be at the beginning of the control region, sPDCCH 415, such a grant may be positioned at a first boundary of the sPDCCH 415 control region. The uplink grants may be clustered at the end of the control region, sPDCCH 415. The uplink/downlink grants may be transmitted by a base station 105 in sPDCCH 415 of resource block 405 according to one of multiple different aggregation levels. In such examples, the downlink grant 425-b, the uplink grant 430, uplink grant 435, and uplink grant 440 may be at the end of sPDCCH 415, with the uplink grant 430 for UE-A at the end of sPDCCH 415 and located at a position at a second boundary of the sPDCCH 415 control region. Each of the downlink grant 425-b, uplink grant 435 and uplink grant 440 may be at positions adjacent the uplink grant 430 for UE-A. A size of sPDCCH 415 may be large enough such that for any aggregation level, the downlink grant 420, downlink grant 425, and multiple uplink grants do not overlap if the downlink grant 420 is at the beginning of sPDCCH 415 and the uplink grants are positioned at the end of sPDCCH 415.

As illustrated in control information format 400, a portion 445 of the control region for sPDCCH 415 may be reallocated to be a part of data region for sPDSCH 450, recapturing unused control overhead from sPDCCH 415. Thus, reallocated sPDSCH portion 445 may be relocated from a portion of the sPDCCH 415. The size of reallocated sPDSCH portion 445 may depend in part on the aggregation level. The resources of sPDCCH 415 that are to be used for reallocated sPDSCH portion 445 may be signaled in the downlink grant 420. In particular, an indication may identify the start of one or more uplink/downlink grants within the sPDCCH 415. In some examples, the indication may be rate matching information field.

Figure 5:
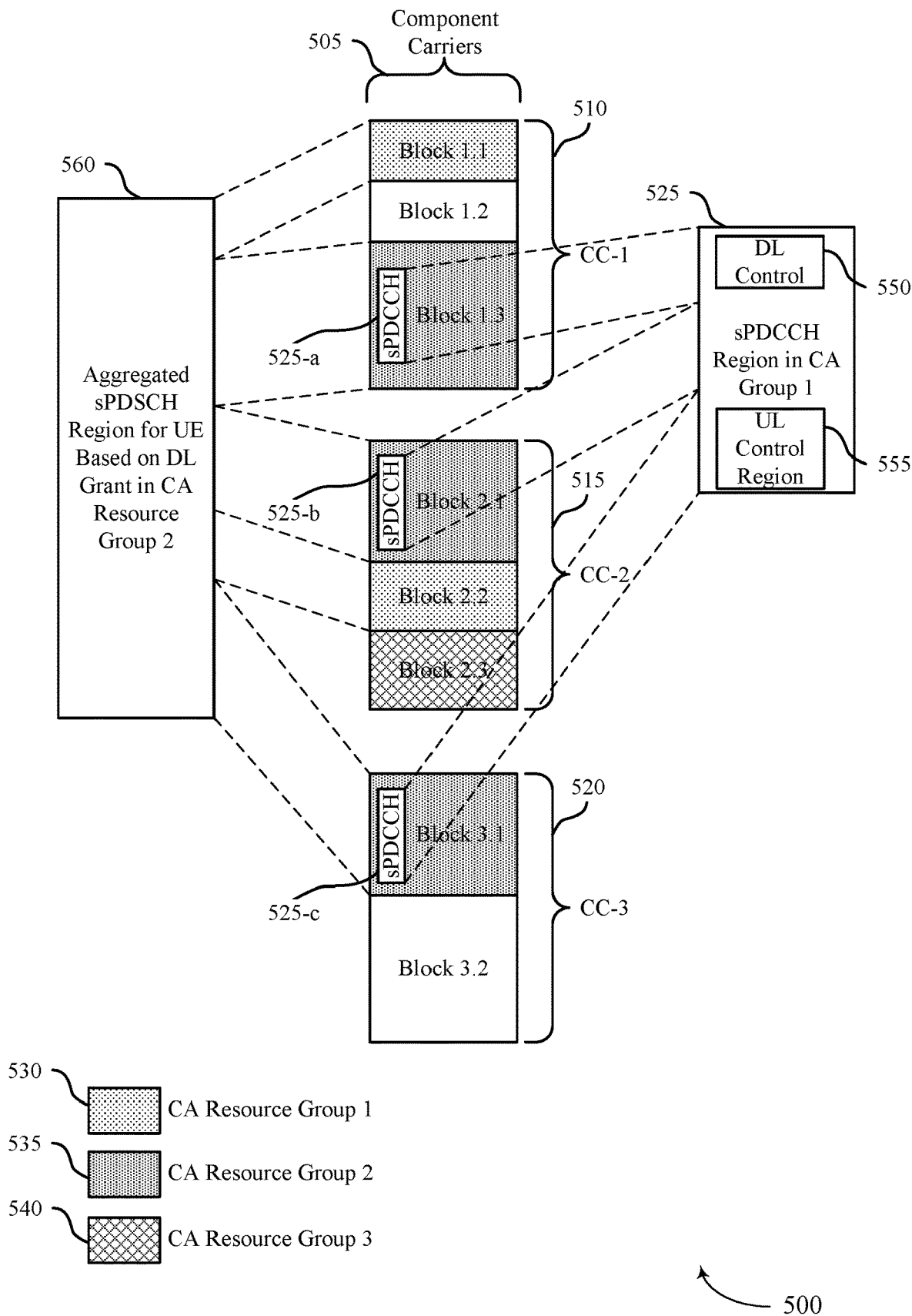
FIG. 5 illustrates an example of carrier aggregation resource groups that span multiple component carriers in accordance with aspects of the present disclosure.

FIG. 5 illustrates an example of carrier aggregation resource groups 500 in accordance with various aspects of the present disclosure. In some examples, carrier aggregation resource groups 500 may implement aspects of wireless communications system 100. In this example, a number of CCs 505 may include resources for multiple carrier aggregation resource groups. The CCs 505 may include a first CC (CC-1) 510, a second CC (CC-2) 515, and a third CC (CC-3) 520.

Portions of the resources of each of the CCs 505 may be allocated to different carrier aggregation resource groups. In this example, a first carrier aggregation resource group 530 includes resources of block 1.1 of the first CC 510 and block 2.2 of the second CC 515. A second carrier aggregation resource group 535 includes block 1.3 of the first CC 510, block 2.1 of the second CC 515, and block 3.1 of the third CC 520. A third carrier aggregation resource group 540 includes block 2.3 of the second CC 515 only. In this example, the second carrier aggregation resource group 535 includes sPDCCH resources 525, which may be an example of sPDCCH 415 of FIG. 4, and may include a downlink control region 550 and an uplink control region 555. As indicated, the sPDCCH resources 525 may be transmitted using resources of the second carrier aggregation resource group, and may include a first portion 525-a transmitted in the first CC 510, a second portion 525-b transmitted in the second CC 515, and a third portion 525-*c* transmitted in the third CC 520. In this example, the downlink control region 550 may provide a grant of PDSCH resources which may be an aggregated sPDSCH region 560 that includes PDSCH resources from both the first carrier aggregation resource group 530 and the second carrier aggregation resource group 535.

By using carrier aggregation resource groups, a base station that is not able to reliably transmit on single component carrier can indicate to the UE that the control grants will be distributed across multiple component carriers. In some cases, a base station may make such a determination based on, for example, channel conditions, error rates at a UE, previous downlink control grant attempts in which UE was not able to meet a downlink decoding reliability target, or combinations thereof. In some cases, the base station may indicate to the UE via RRC signaling that the search space for downlink control grants can now be sent in one or more CCs 505 according to one or more defined carrier aggregation resource groups, such as carrier aggregation resource groups 530 through 540 illustrated in FIG. 5. Each carrier aggregation resource group may be identified by specific resources across multiple CCs 505 where a UE can access the downlink control grants, and the base station may define multiple carrier aggregation resource groups by aggregating resource blocks across multiple CCs 505. In some cases, each group can include one or more component carriers up to the maximum number of CCs. In some cases, UEs can be assigned a set of carrier aggregation resource groups. In some cases, UEs sharing common sets may share the same control and data regions. A UE may perform blind decodes for potential control information in control resources, and a number of blind decodes required is proportional to the number of carrier aggregation resource groups assigned to a particular UE. In cases where the control grants are self-contained within the downlink data grant, then these carrier aggregation resource groups identify both the downlink data PDSCH region as well as the control grant regions. In some cases, the control and data resource allocation structure such as described in FIGS. 3 and 4 may be used.

In some cases, the downlink control information (DCI) structure can reuse same structure as in FIGS. 3 and 4 as well. In such cases, the downlink control grants may be located in pre-defined sPDCCH resources within the carrier aggregation resource group allocations. In some cases, resources can be defined either in a localized or distributed manner within a carrier aggregation resource group. In some cases, downlink grants and uplink grants may be allocated at the beginning and end of the control region, respectively, similarly as discussed above. In some cases, to further reduce the number of blind decodes, the aggregation level can be constrained to the largest aggregation size. In some cases, to reduce control overhead, the PDSCH allocation may be defined by aggregating multiple carrier aggregation resource groups, such as illustrated in the aggregated PDSCH region 560 of FIG. 5. In some examples aggregation bits defined in the downlink DCI grant can aggregate multiple carrier aggregation resource groups that are defined within the set of carrier aggregation resource groups assigned to the UE. Such a technique also allows the PDSCH to be transmitted on a superset of carriers relative to the control PDCCH channel carrier set.

In some cases, control resources that are unused can be reused as PDSCH via the set of rate matching bits such as discussed above with respect to FIGS. 3 and 4. By separating downlink and uplink grants, rate matching control bits can be included in the downlink control region 550 that identifies the size of the uplink control region 555. Portions of the sPDCCH resources 525 that are outside of the uplink control region 555 may be reused as PDSCH.

Based on designed carrier aggregation resource group structure and allocation, a single carrier sTTI user and a multi-CC sTTI user can coexist. Since a carrier aggregation resource group maintains a single CC resource block as an atomic unit to aggregate, different UEs may be configured with appropriate carrier aggregation resource groups. Such allocations may enable greater multiplexing flexibility between different types of UEs. In some cases, carrier aggregation resource group configurations can be updated via RRC. In some cases, one or more CCs may be activated and deactivated. In such cases, if a current carrier aggregation resource group contains a carrier that has been deactivated, then both the base station and UE may still use that group but with the resources from the deactivated carrier eliminated. Further, if a deactivated carrier is activated, then both the base station and UE may again use resources of the activated carrier.

Figure 6:
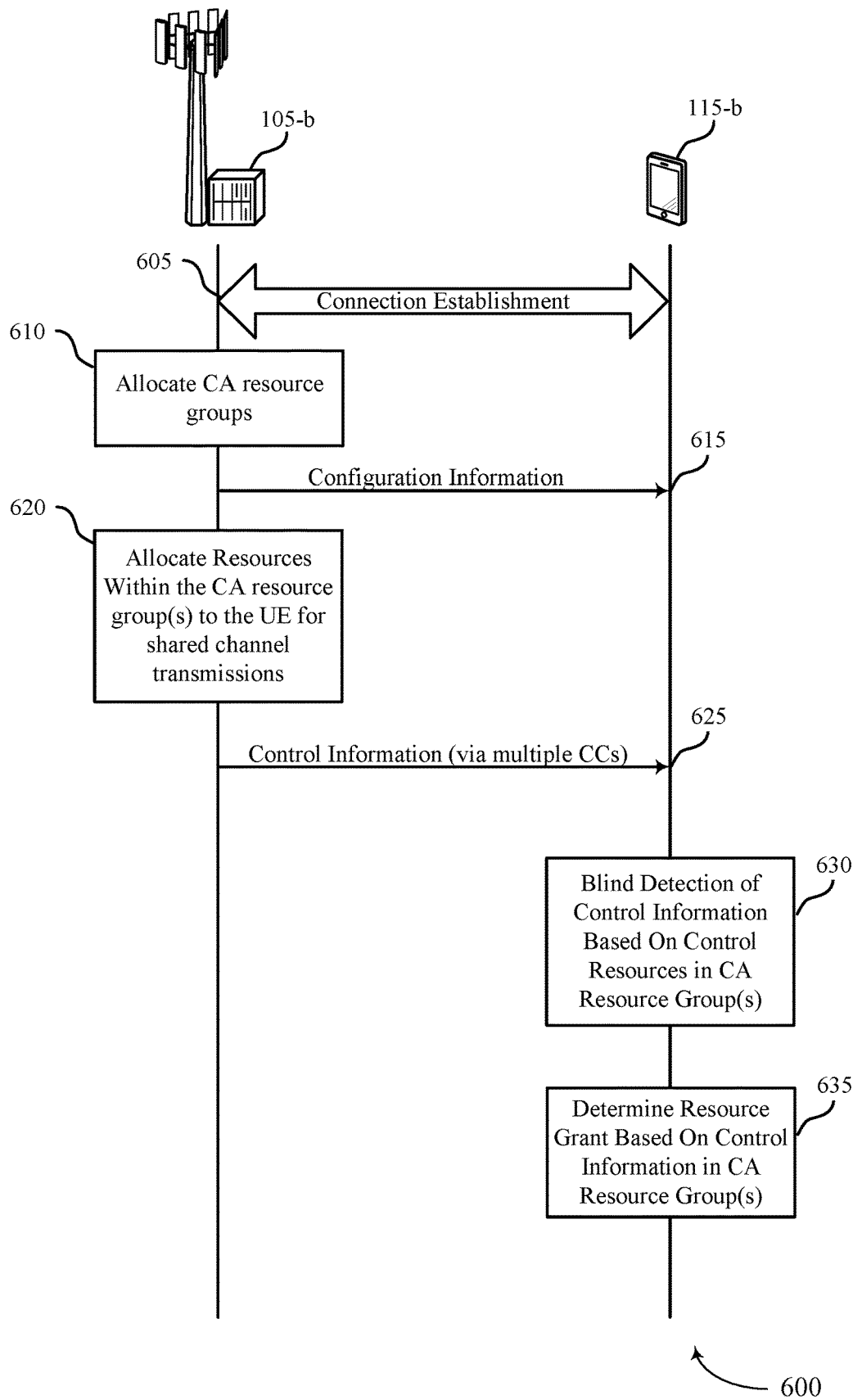
FIG. 6 illustrates an example of a process flow that supports downlink control allocation using carrier aggregation resource groups in accordance with aspects of the present disclosure.

FIG. 6 illustrates an example of a process flow 600 that supports downlink control allocation using carrier aggregation resource groups in accordance with various aspects of the present disclosure. Process flow 600 may include a base station 105-*b* and a UE 115-*b*, which may be examples of the corresponding devices described with reference to FIGS. 1 and 2. The base station 105-*b* and the second UE 115-*b* may establish a connection 605 according to established connection establishment techniques for the wireless communications system. In some examples, the UE 115-*b* may be configured with two or more CCs.

At block 610, base station 105-*b* may allocate carrier aggregation resource groups for downlink and/or uplink transmissions between the UE 115-*b* and the base station 105-*b*. The CCs and associated resources of each carrier aggregation resource group identified by the base station 105-*b*. In some examples, the CCs and resources may be identified based on sTTI resources available and low latency services being used by the UE 115-*b* (and/or other UEs), for example, and CCs that may be configured for sTTI transmissions. In some cases, the base station 105-*b* may reallocate resources to sTTI transmissions, or away from sTTI transmissions, based on current traffic conditions and may use such allocations to identify CCs and associated resources for one or more carrier aggregation resource groups. The base station 105-*b* may transmit configuration information 615 that may indicate the carrier aggregation resource group(s) that the UE 115-*b* may use for PDCCH and/or PDSCH transmissions.

At block 620, the base station 105-*b* may allocate resources within the carrier aggregation resource group(s) to the UE 115-*b* for shared channel transmissions. In some cases, resources from two or more carrier aggregation resource groups may be allocated for the UE 115-*b* PDSCH transmissions or PUSCH transmissions. The base station 105-*b* may transmit the control information to the UE 115-*b* via control information transmission 625. As discussed above, the control information transmission 625 may use a carrier aggregation resource group that may include resources from one or more CCs.

At block 630, the UE 115-*b* may perform blind decoding of control information in one or more carrier access resource groups according to the configured carrier access resource group(s). In some cases, the UE 115-*b* may identify resources of two or more CCs that are to be monitored for sPDSCH transmissions, and the UE 115-*b* may blind decode receptions at the identified resources to determine the presence of a sPDSCH transmission.

In the event that one or more portions of the monitored resources includes control information, the UE 115-*b*, at block 635, may determine a resource grant based on control information decoded from one or more of the blind decoding attempts. The UE 115-*b* may then receive downlink shared channel transmissions, or transmit uplink transmissions, according to the resource grant of the monitored resources.

Figure 7:
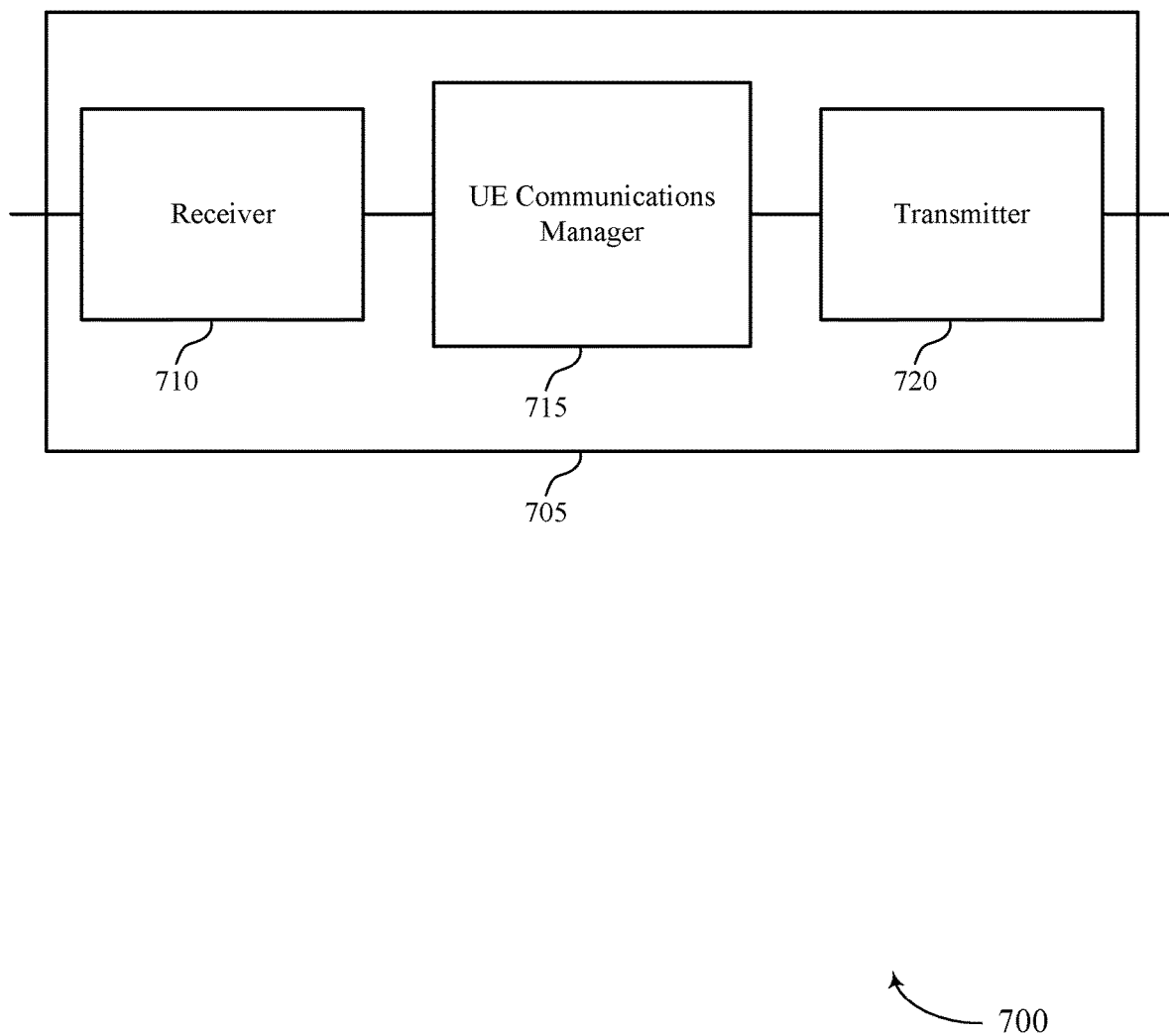
FIGS. 7 through 9 show block diagrams of a device that supports downlink control allocation using carrier aggregation resource groups in accordance with aspects of the present disclosure.

FIG. 7 shows a block diagram 700 of a wireless device 705 that supports downlink control allocation using carrier aggregation resource groups in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to downlink control allocation using carrier aggregation resource groups, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive signaling from a base station that indicates resources in at least a first component carrier and a second component carrier are allocated to a first carrier aggregation resource group, receive, over the first component carrier, a first portion of control information, receive, over the second component carrier, a second portion of the control information, and determine a resource grant based on both the first portion of the control information and the second portion of the control information. In some cases, the resource grant may comprise an allocation of resources for shared channel transmission from one or more component carriers allocated to the first carrier aggregation resource group.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
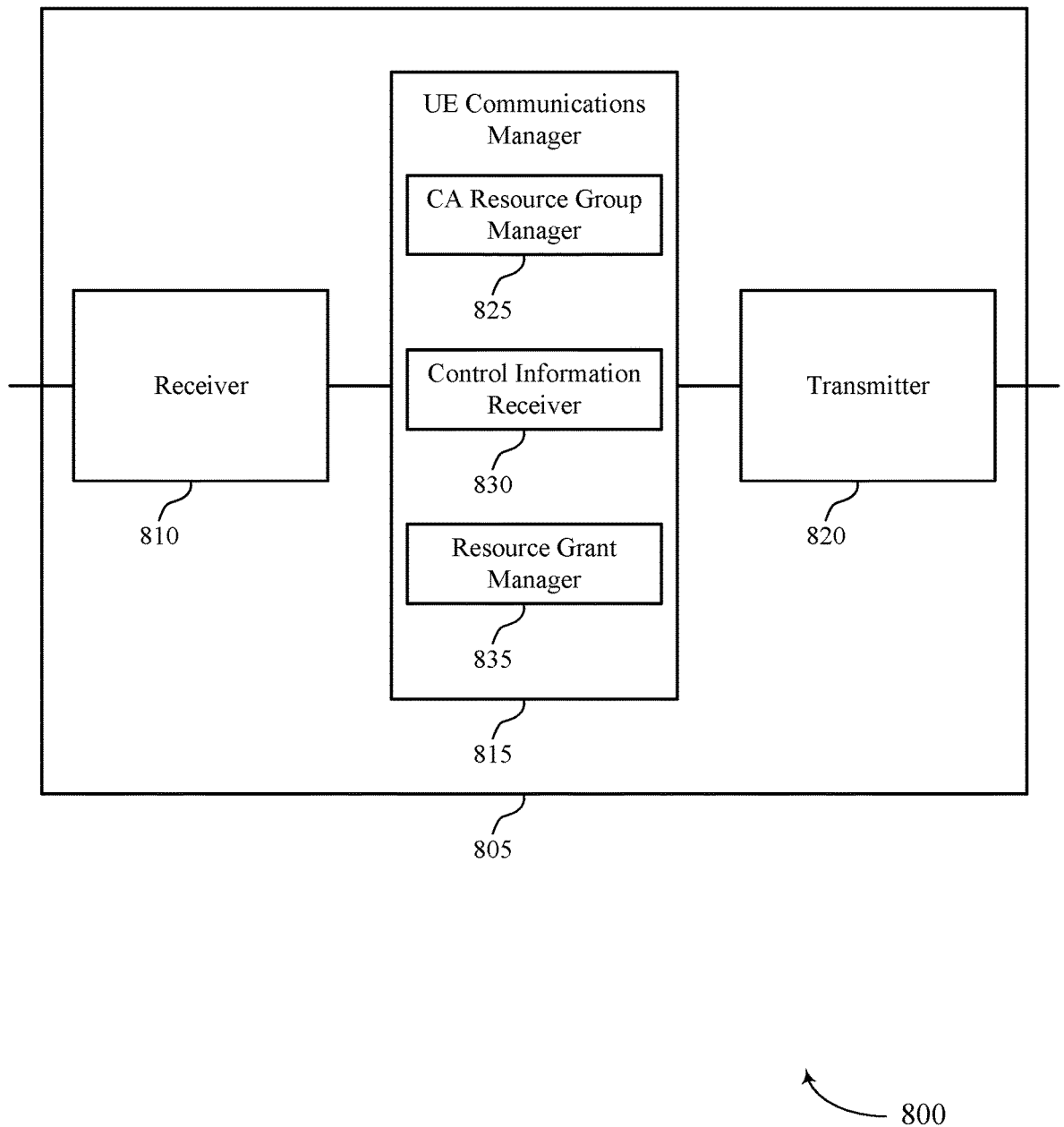

FIG. 8 shows a block diagram 800 of a wireless device 805 that supports downlink control allocation using carrier aggregation resource groups in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to downlink control allocation using carrier aggregation resource groups, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include carrier aggregation (CA) resource group manager 825, control information receiver 830, and resource grant manager 835.

CA resource group manager 825 may receive signaling from a base station that indicates resources in at least a first component carrier and a second component carrier are allocated to a first carrier aggregation resource group, and may identify a control region in the first carrier aggregation resource group. In some cases, a UE may receive RRC signaling indicating that a second component carrier is deactivated, and disregard resources associated with the second component carrier that are included in the first carrier aggregation resource group. In some cases, RRC signaling may be received that indicates that a third component carrier is activated, and allocated resources may be identified in a third component carrier that are included in the first carrier aggregation resource group. A third portion of the control information may be transmitted using the third component carrier over a third subset of the allocated resources. In some cases, the signaling from the base station indicates that the first carrier aggregation resource group and a second carrier aggregation resource group are to be monitored for control information, and the resource grant indicates that shared channel resources are allocated in the first carrier aggregation resource group, the second carrier aggregation resource group, and a third carrier aggregation resource group. In some cases, the first carrier aggregation resource group includes: a first block of resources from the first component carrier, and where the first portion of control information includes a first subset of resources of the first block of resources, and a second block of resources from the second component carrier, and where the second portion of control information includes a second subset of resources of the second block of resources. In some cases, the allocation of resources for shared channel transmission may comprise resources from the first component carrier, and the first portion of the control information may comprise a subset of resources that are localized or distributed within the allocation of resources for shared channel transmission resources.

Control information receiver 830 may receive, over the first component carrier, a first portion of control information, receive, over the second component carrier, a second portion of the control information, and blindly decode the identified control region, and where the receiving the first portion of the control information and the second portion of the control information is based on successfully blind decoding the first portion of control information and the second portion of the control information.

Resource grant manager 835 may determine a resource grant based on the first portion of the control information and the second portion of the control information. In some cases, the determining the resource grant includes identifying a shared channel resource allocation of at least the first component carrier and the second component carrier allocated to the first carrier aggregation resource group. In some cases, one or more of the first portion of the control information or the second portion of the control information includes a downlink control information portion and an uplink control information portion, and where one or more rate-matching bits in the downlink control information portion indicate that all or a portion of the control information is to be reused for shared channel transmissions.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
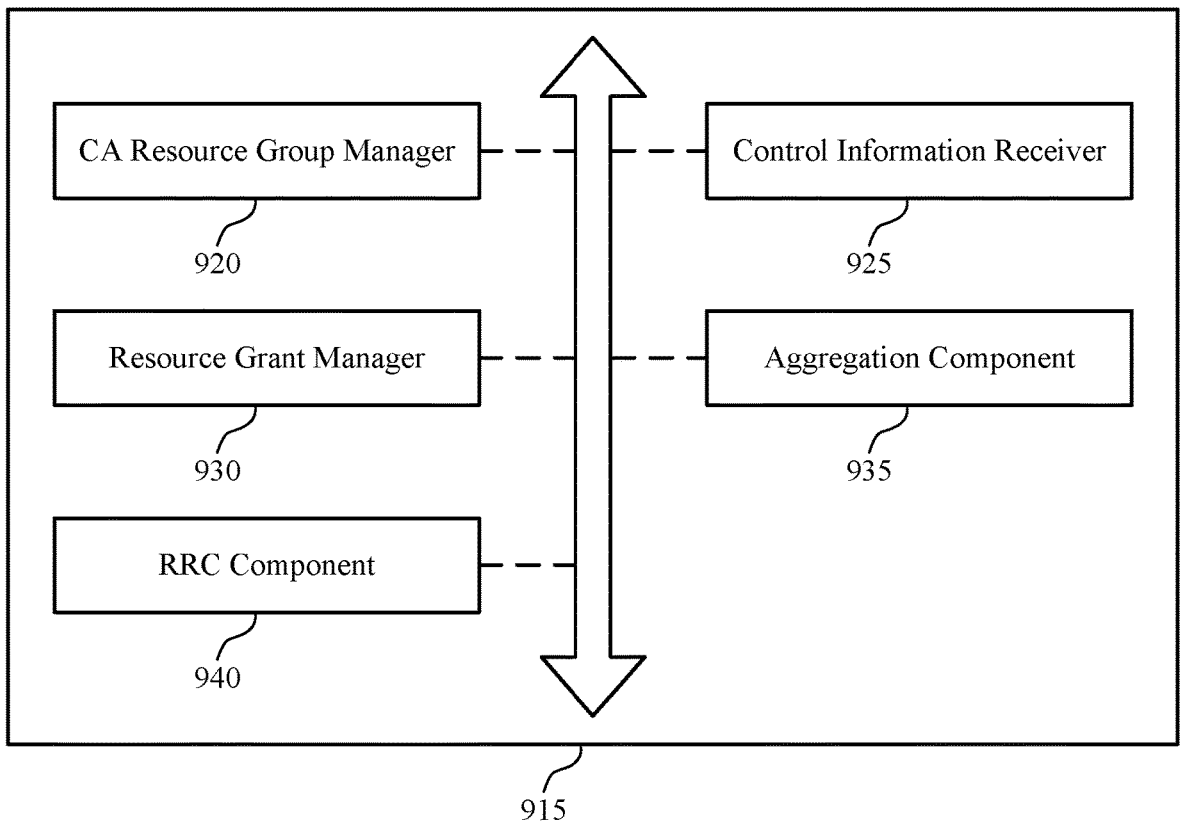

FIG. 9 shows a block diagram 900 of a UE communications manager 915 that supports downlink control allocation using carrier aggregation resource groups in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include CA resource group manager 920, control information receiver 925, resource grant manager 930, aggregation component 935, and RRC component 940. Each of these modules may communicate, directly or indirectly, with one another (e.g., via one or more buses).

CA resource group manager 920 may receive signaling from a base station that indicates resources in at least a first component carrier and a second component carrier are allocated to a first carrier aggregation resource group, and may identify a control region in the first carrier aggregation resource group. In some cases, a UE may receive RRC signaling indicating that a second component carrier is deactivated, and disregard resources associated with the second component carrier that are included in the first carrier aggregation resource group. In some cases, RRC signaling may be received that indicates that a third component carrier is activated, and allocated resources may be identified in a third component carrier that are included in the first carrier aggregation resource group. A third portion of the control information may be transmitted using the third component carrier over a third subset of the allocated resources. In some cases, the signaling from the base station indicates that the first carrier aggregation resource group and a second carrier aggregation resource group are to be monitored for control information, and the resource grant indicates that shared channel resources are allocated in the first carrier aggregation resource group, the second carrier aggregation resource group, and a third carrier aggregation resource group. In some cases, the first carrier aggregation resource group includes: a first block of resources from the first component carrier, and where the first portion of control information includes a first subset of resources of the first block of resources, and a second block of resources from the second component carrier, and where the second portion of control information includes a second subset of resources of the second block of resources. In some cases, the allocation of resources for shared channel transmission may comprise resources from the first component carrier, and the first portion of the control information may comprise a subset of resources that are localized or distributed within the allocation of resources for shared channel transmission resources.

Control information receiver 925 may receive, over the first component carrier, a first portion of control information, receive, over the second component carrier, a second portion of the control information, and blindly decode the identified control region, and where the receiving the first portion of the control information and the second portion of the control information is based on successfully blind decoding the first portion of control information and the second portion of the control information.

Resource grant manager 930 may determine a resource grant based on the first portion of the control information and the second portion of the control information. In some cases, the resource grant may comprise an allocation of resources for shared channel transmission from one or more component carriers allocated to the first carrier aggregation resource group. In some cases, the determining the resource grant includes identifying a shared channel resource allocation of at least the first component carrier and the second component carrier allocated to the first carrier aggregation resource group. In some cases, one or more of the first portion of the control information or the second portion of the control information includes a downlink control information portion and an uplink control information portion, and where one or more rate-matching bits in the downlink control information portion indicate that all or a portion of the control information is to be reused for shared channel transmissions.

Aggregation component 935 may aggregate resources according to an aggregation level. In some cases, the resource grant includes one or more aggregation bits that indicate that shared channel transmissions in at least the first carrier aggregation resource group and a second carrier aggregation resource group are to be aggregated. In some cases, the second carrier aggregation resource group may comprise at least one component carrier in common with the first carrier aggregation resource group and at least one component carrier that is not allocated to the first carrier aggregation resource group. In some cases, the first portion of the control information and the second portion of the control information are aggregated according to a largest available aggregation size of the first component carrier and the second component carrier.

RRC component 940 may receive and process RRC signaling. In some cases, RRC signaling may be used to configure carrier aggregation resource groups and portions of such carrier aggregation resources that may contain control information.

Figure 10:
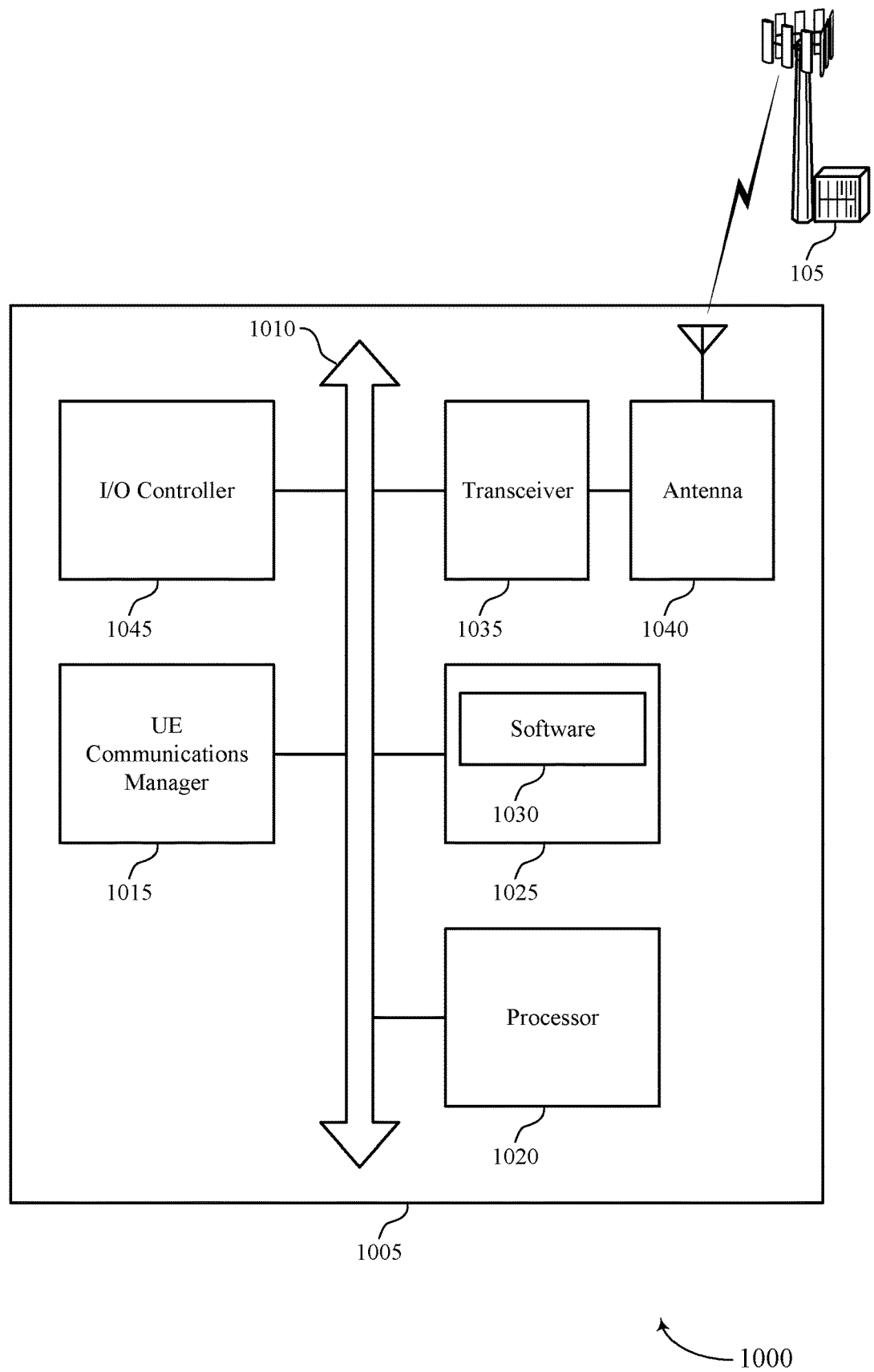
FIG. 10 illustrates a block diagram of a system including a UE that supports downlink control allocation using carrier aggregation resource groups in accordance with aspects of the present disclosure.

FIG. 10 shows a diagram of a system 1000 including a device 1005 that supports downlink control allocation using carrier aggregation resource groups in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting downlink control allocation using carrier aggregation resource groups).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support downlink control allocation using carrier aggregation resource groups. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
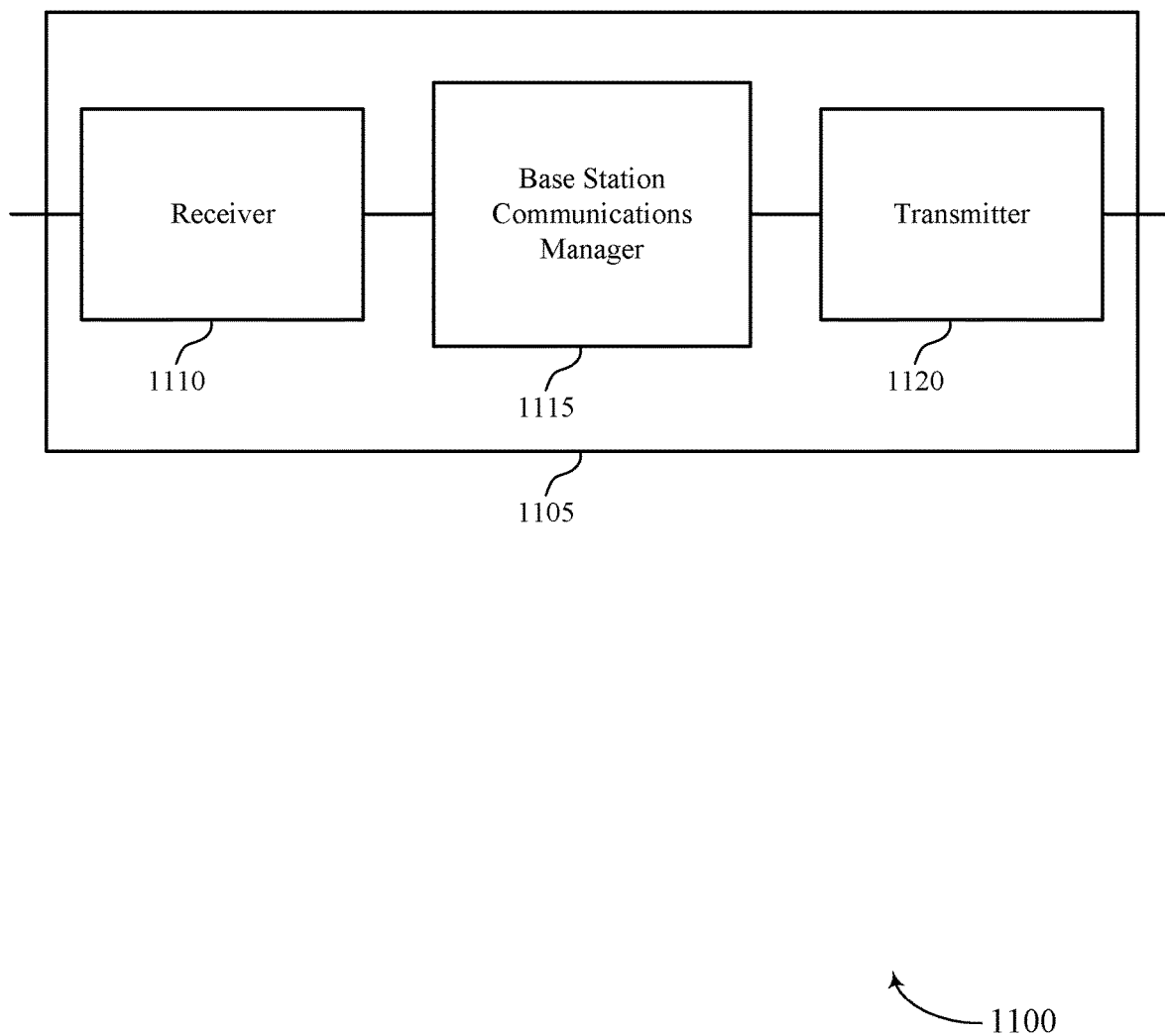
FIGS. 11 through 13 show block diagrams of a device that supports downlink control allocation using carrier aggregation resource groups in accordance with aspects of the present disclosure.

FIG. 11 shows a block diagram 1100 of a wireless device 1105 that supports downlink control allocation using carrier aggregation resource groups in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to downlink control allocation using carrier aggregation resource groups, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may allocate resources in at least a first component carrier and a second component carrier for a first carrier aggregation resource group, transmit signaling to a UE that indicates the first carrier aggregation resource group and resources in at least the first component carrier and the second component carrier allocated to the first carrier aggregation resource group, providing configuration information for the UE to monitor a first subset of the allocated resources on the first component carrier for a first portion of control information and to monitor a second subset of the allocated resources on the second component carrier for a second portion of the control information, allocate shared channel resources within the carrier aggregation resource group to the UE for shared channel transmissions, and transmit an indication of the allocated shared channel resources to the UE in the first portion of the control information and the second portion of the control information.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
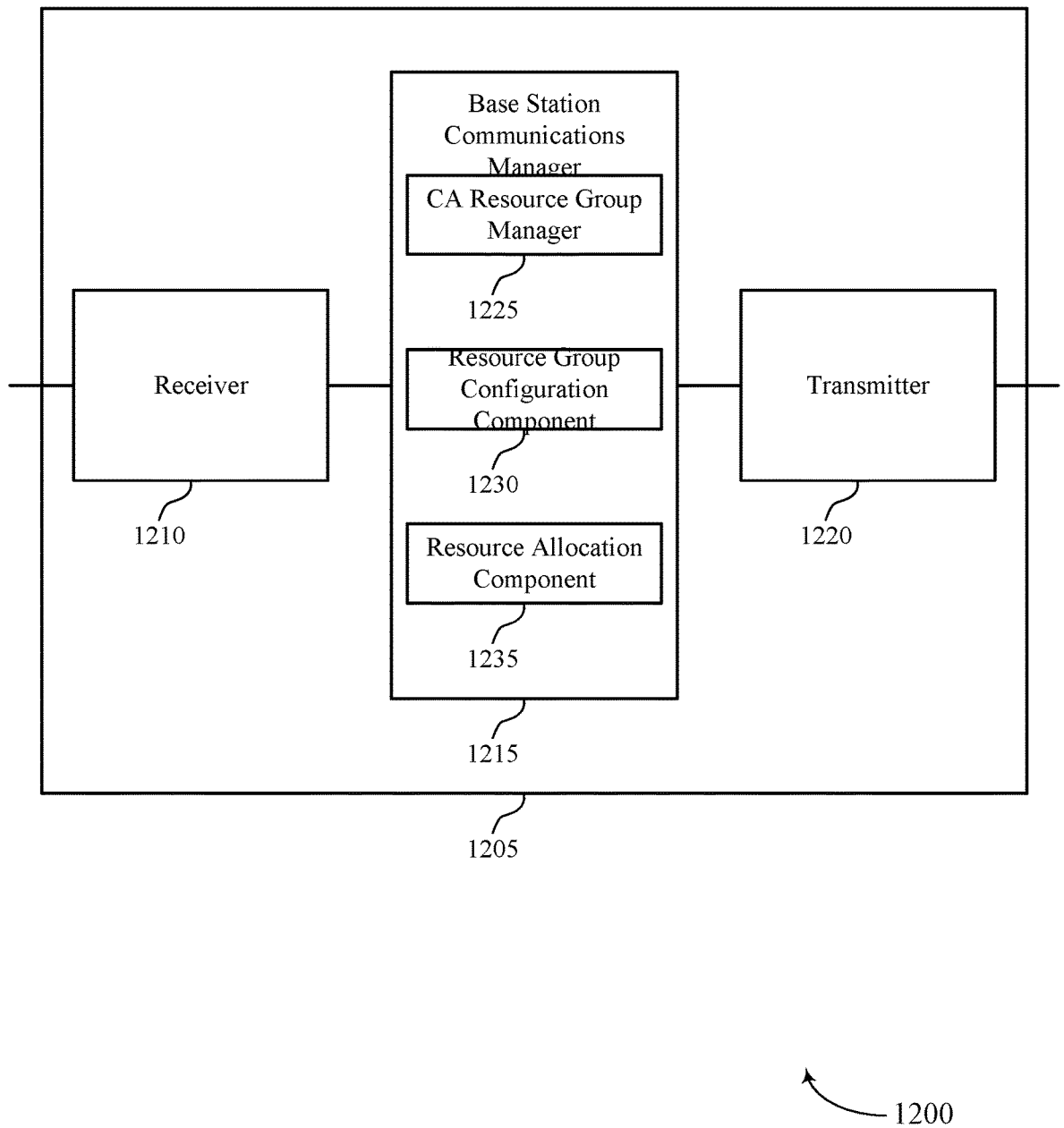

FIG. 12 shows a block diagram 1200 of a wireless device 1205 that supports downlink control allocation using carrier aggregation resource groups in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to downlink control allocation using carrier aggregation resource groups, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include CA resource group manager 1225, resource group configuration component 1230, and resource allocation component 1235.

CA resource group manager 1225 may allocate resources in at least a first component carrier and a second component carrier for a first carrier aggregation resource group. In some cases, the allocated shared channel resources include shared channel resource allocations in one or more of the carrier aggregation resource groups. In some cases, the carrier aggregation resource group includes: a first block of resources from the first component carrier, and where the first portion of control information includes a first subset of resources of the first block of resources, and a second block of resources from the second component carrier, and where the second portion of control information includes a second subset of resources of the second block of resources. In some cases, the allocation of resources for shared channel transmission may comprise resources from the first component carrier, and the first portion of the control information may comprise a subset of resources that are localized or distributed within the allocation of resources for shared channel transmission resources.

Resource group configuration component 1230 may transmit signaling to a UE that indicates the first carrier aggregation resource group and resources in at least the first component carrier and the second component carrier allocated to the first carrier aggregation resource group, provide configuration information for the UE to monitor a first subset of the allocated resources on the first component carrier for a first portion of control information and to monitor a second subset of the allocated resources on the second component carrier for a second portion of the control information. In some cases, resource group configuration component 1230 may determine a channel condition or error rate associated with the first component carrier. In some cases, the providing configuration information for the UE to monitor the first subset of the allocated resources on the first component carrier for the first portion of control information and to monitor the second subset of the allocated resources on the second component carrier for the second portion of the control information may be based at least in part the determining the channel condition or error rate. In some cases, resource group configuration component 1230 may initiate transmission of RRC signaling indicating that the second component carrier is deactivated, and discontinue transmissions using resources associated with the second component carrier that are included in the carrier aggregation resource group. In some cases, RRC signaling indicating that a third component carrier is activated may be transmitted, and the base station may identify allocated resources in the third component carrier that are included in the carrier aggregation resource group, and transmit, over the third component carrier, a third portion of the control information over a third subset of the allocated resources. In some cases, the signaling identifies a control region in each of the first component carrier and the second component carrier for blind decoding at the UE.

In some cases, the signaling indicates a first carrier aggregation resource group and a second carrier aggregation resource group are to be monitored for control information, and the allocated shared channel resources are allocated in the first carrier aggregation resource group, the second carrier aggregation resource group, and a third carrier aggregation resource group. In some cases, the signaling includes one or more aggregation bits that indicate that shared channel transmissions in two or more carrier aggregation resource groups are to be aggregated. In some cases, one or more of the first portion of the control information or the second portion of the control information includes a downlink control information portion and an uplink control information portion, and where one or more rate-matching bits in the downlink control information portion indicate that all or a portion of the control information is to be reused for shared channel transmissions. In some cases, the first portion of the control information and the second portion of the control information are aggregated according to a largest available aggregation size of the first component carrier and the second component carrier.

Resource allocation component 1235 may allocate shared channel resources within the carrier aggregation resource group to the UE for shared channel transmissions and transmit an indication of the allocated shared channel resources to the UE in the first portion of the control information and the second portion of the control information.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
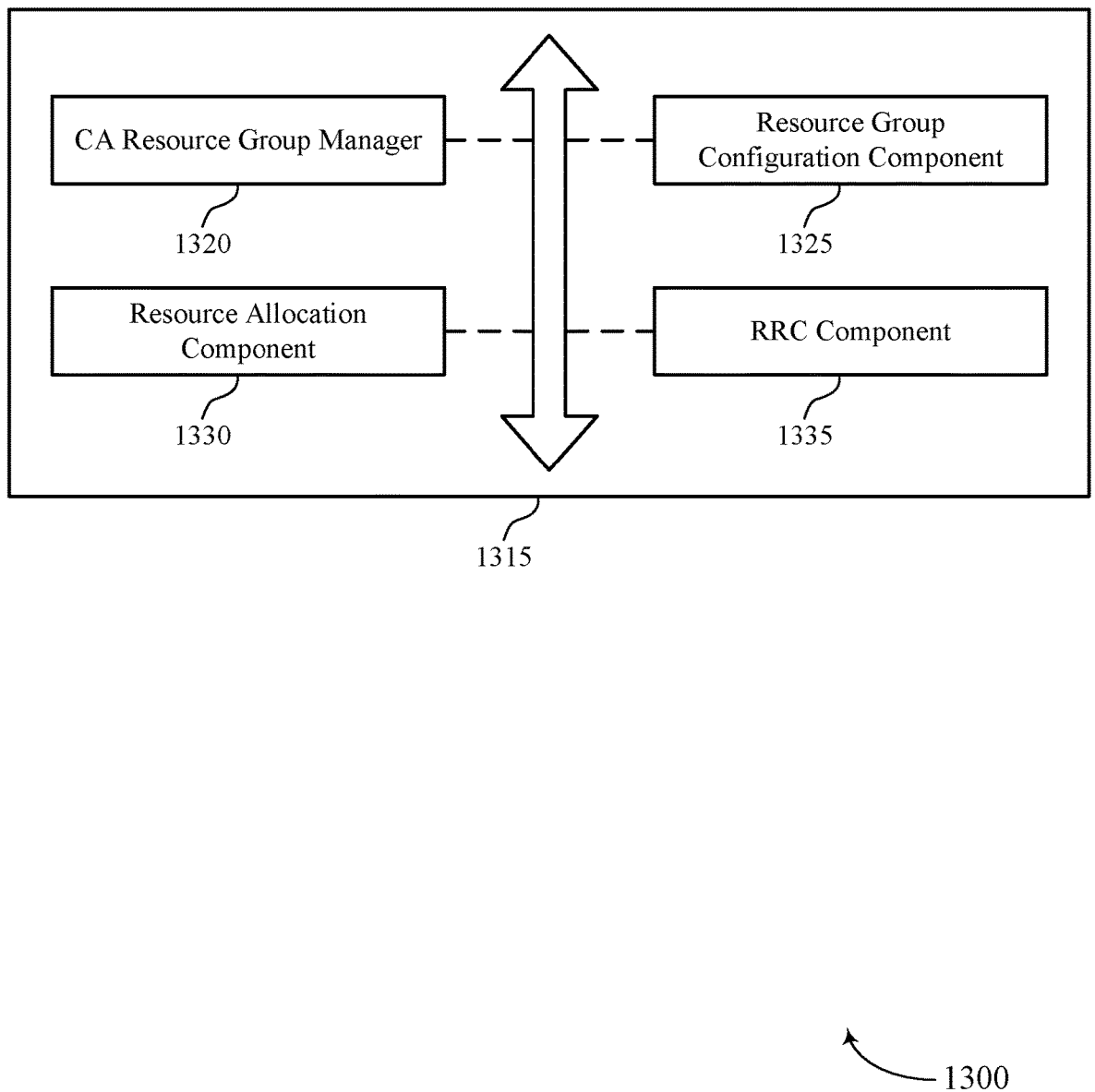

FIG. 13 shows a block diagram 1300 of a base station communications manager 1315 that supports downlink control allocation using carrier aggregation resource groups in accordance with aspects of the present disclosure. The base station communications manager 1315 may be an example of aspects of a base station communications manager 1415 described with reference to FIGS. 11, 12, and 14. The base station communications manager 1315 may include CA resource group manager 1320, resource group configuration component 1325, resource allocation component 1330, and RRC component 1335. Each of these modules may communicate, directly or indirectly, with one another (e.g., via one or more buses).

CA resource group manager 1320 may allocate resources in at least a first component carrier and a second component carrier for a first carrier aggregation resource group. In some cases, the allocated shared channel resources include shared channel resource allocations in one or more of the carrier aggregation resource groups. In some cases, the carrier aggregation resource group includes: a first block of resources from the first component carrier, and where the first portion of control information includes a first subset of resources of the first block of resources, and a second block of resources from the second component carrier, and where the second portion of control information includes a second subset of resources of the second block of resources. In some cases, the allocated resources for shared channel transmission may comprise resources from the first component carrier, and the first portion of the control information may comprise a subset of resources that are localized or distributed within the allocated resources for shared channel transmission resources.

Resource group configuration component 1325 may transmit signaling to a UE that indicates the first carrier aggregation resource group and resources in at least the first component carrier and the second component carrier allocated to the first carrier aggregation resource group, provide configuration information for the UE to monitor a first subset of the allocated resources on the first component carrier for a first portion of control information and to monitor a second subset of the allocated resources on the second component carrier for a second portion of the control information. In some cases, resource group configuration component 1325 may determine a channel condition or error rate associated with the first component carrier. In some cases, the providing configuration information for the UE to monitor the first subset of the allocated resources on the first component carrier for the first portion of control information and to monitor the second subset of the allocated resources on the second component carrier for the second portion of the control information may be based at least in part the determining the channel condition or error rate. In some cases, resource group configuration component 1325 may initiate transmission of RRC signaling indicating that the second component carrier is deactivated, and discontinue transmissions using resources associated with the second component carrier that are included in the carrier aggregation resource group. In some cases, RRC signaling indicating that a third component carrier is activated may be transmitted, and the base station may identify allocated resources in the third component carrier that are included in the carrier aggregation resource group, and transmit, over the third component carrier, a third portion of the control information over a third subset of the allocated resources. In some cases, the signaling identifies a control region in each of the first component carrier and the second component carrier for blind decoding at the UE.

In some cases, the signaling indicates a first carrier aggregation resource group and a second carrier aggregation resource group are to be monitored for control information, and the allocated shared channel resources are allocated in the first carrier aggregation resource group, the second carrier aggregation resource group, and a third carrier aggregation resource group. In some cases, the signaling includes one or more aggregation bits that indicate that shared channel transmissions in two or more carrier aggregation resource groups are to be aggregated. In some cases, one or more of the first portion of the control information or the second portion of the control information includes a downlink control information portion and an uplink control information portion, and where one or more rate-matching bits in the downlink control information portion indicate that all or a portion of the control information is to be reused for shared channel transmissions. In some cases, the first portion of the control information and the second portion of the control information are aggregated according to a largest available aggregation size of the first component carrier and the second component carrier.

Resource allocation component 1330 may allocate shared channel resources within the carrier aggregation resource group to the UE for shared channel transmissions and transmit an indication of the allocated shared channel resources to the UE in the first portion of the control information and the second portion of the control information.

RRC component 1335 may initiate RRC signaling transmissions with a UE to configure one or more carrier aggregation resource groups, configure control resources within one or more of the carrier aggregation groups, or any combination thereof.

Figure 14:
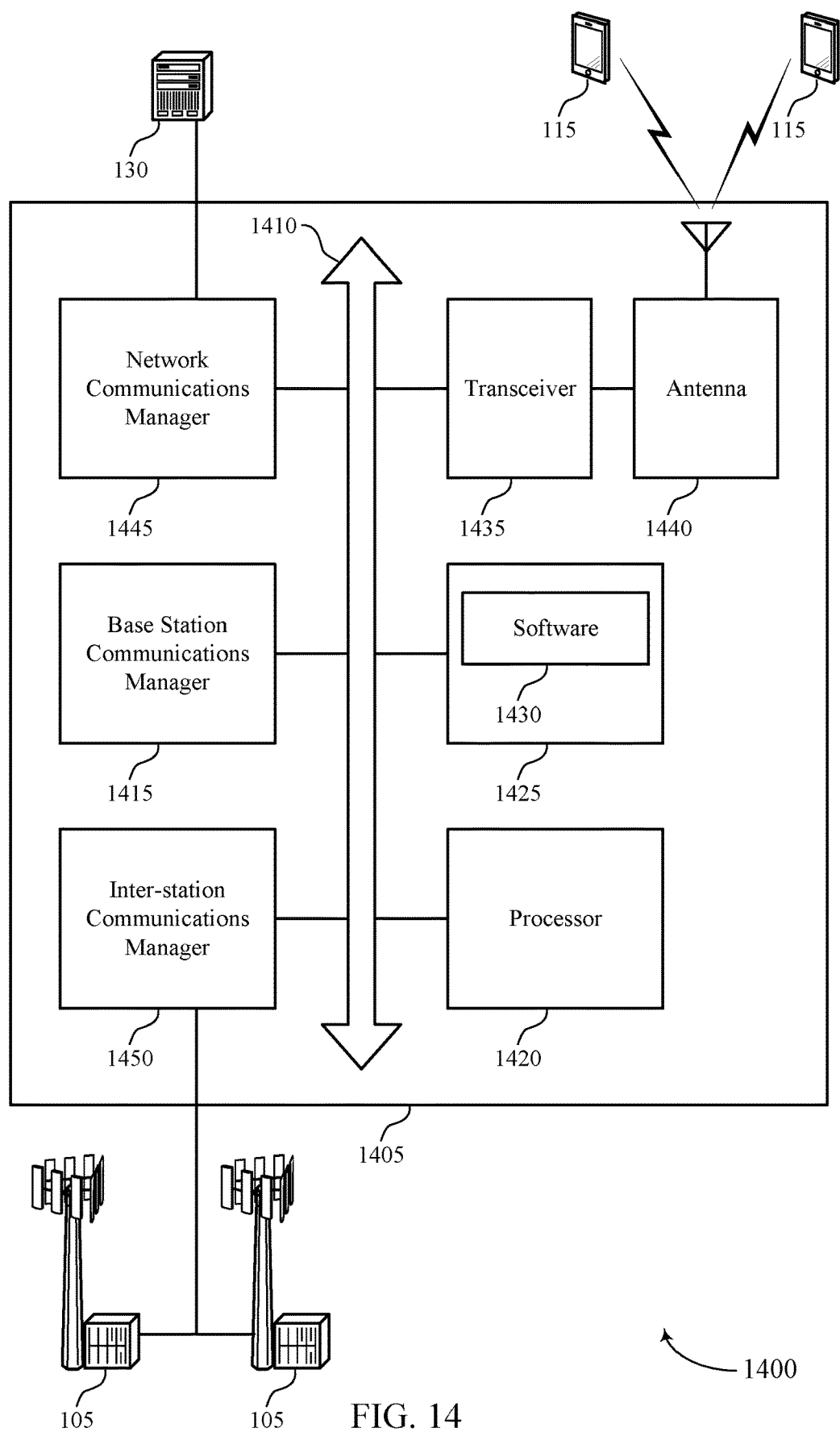
FIG. 14 illustrates a block diagram of a system including a base station that supports downlink control allocation using carrier aggregation resource groups in accordance with aspects of the present disclosure.

FIG. 14 shows a diagram of a system 1400 including a device 1405 that supports downlink control allocation using carrier aggregation resource groups in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting downlink control allocation using carrier aggregation resource groups).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support downlink control allocation using carrier aggregation resource groups. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
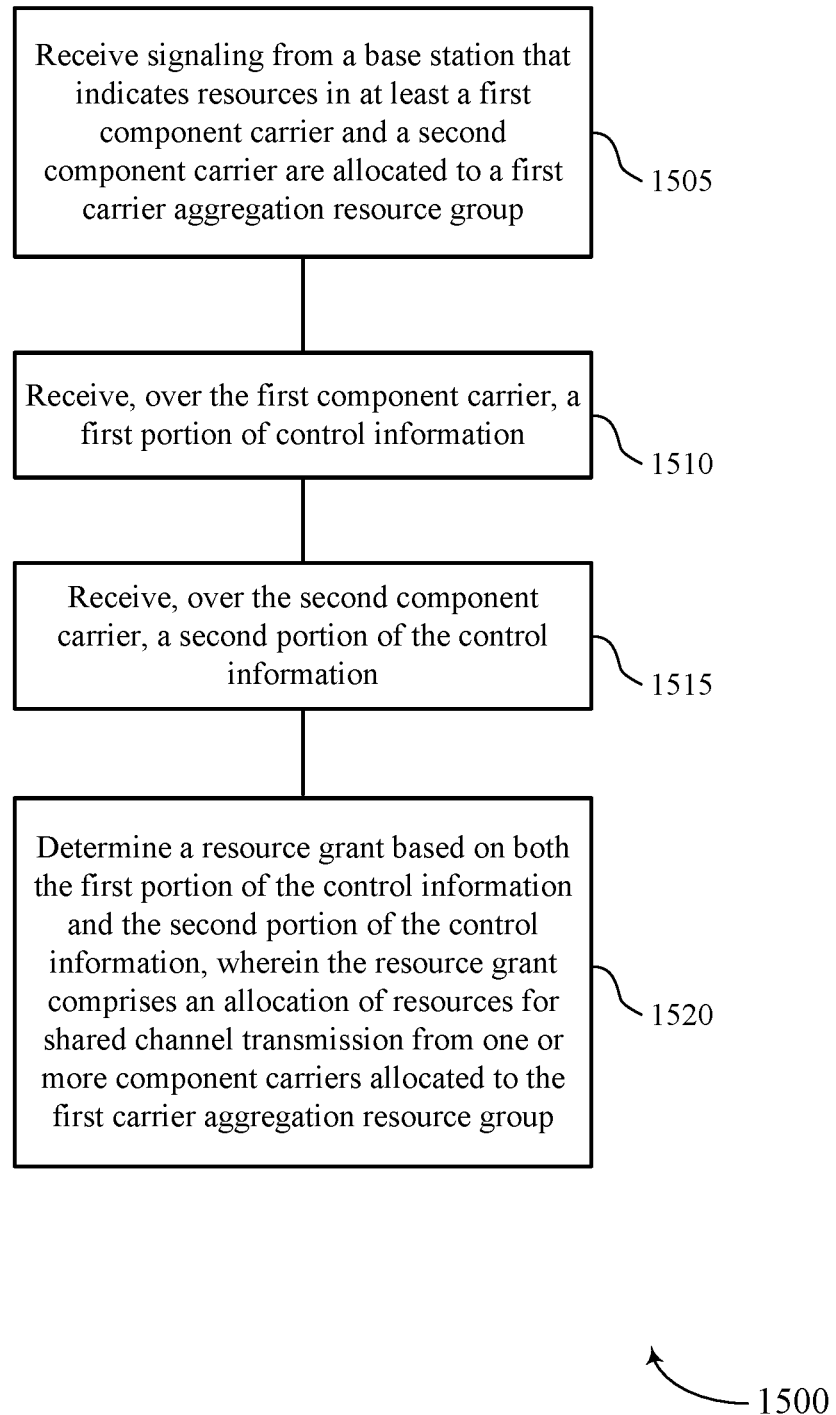
FIGS. 15 through 21 illustrate methods for downlink control allocation using carrier aggregation resource groups in accordance with aspects of the present disclosure.

FIG. 15 shows a flowchart illustrating a method 1500 for downlink control allocation using carrier aggregation resource groups in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive signaling from a base station that indicates resources in at least a first component carrier and a second component carrier are allocated to a first carrier aggregation resource group. The operations of block 1505 may be performed according to the methods described herein. In certain examples, aspects of the operations of block 1505 may be performed by a CA resource group manager as described with reference to FIGS. 7 through 10.

At block 1510 the UE 115 may receive, over the first component carrier, a first portion of control information. The operations of block 1510 may be performed according to the methods described herein. In certain examples, aspects of the operations of block 1510 may be performed by a control information receiver as described with reference to FIGS. 7 through 10.

At block 1515 the UE 115 may receive, over the second component carrier, a second portion of the control information. The operations of block 1515 may be performed according to the methods described herein. In certain examples, aspects of the operations of block 1515 may be performed by a control information receiver as described with reference to FIGS. 7 through 10.

At block 1520 the UE 115 may determine a resource grant based at least in part on the first portion of the control information and the second portion of the control information. In some cases, the resource grant may comprise an allocation of resources for shared channel transmission from one or more component carriers allocated to the first carrier aggregation resource group. The operations of block 1520 may be performed according to the methods described herein. In certain examples, aspects of the operations of block 1520 may be performed by a resource grant manager as described with reference to FIGS. 7 through 10.

Figure 16:
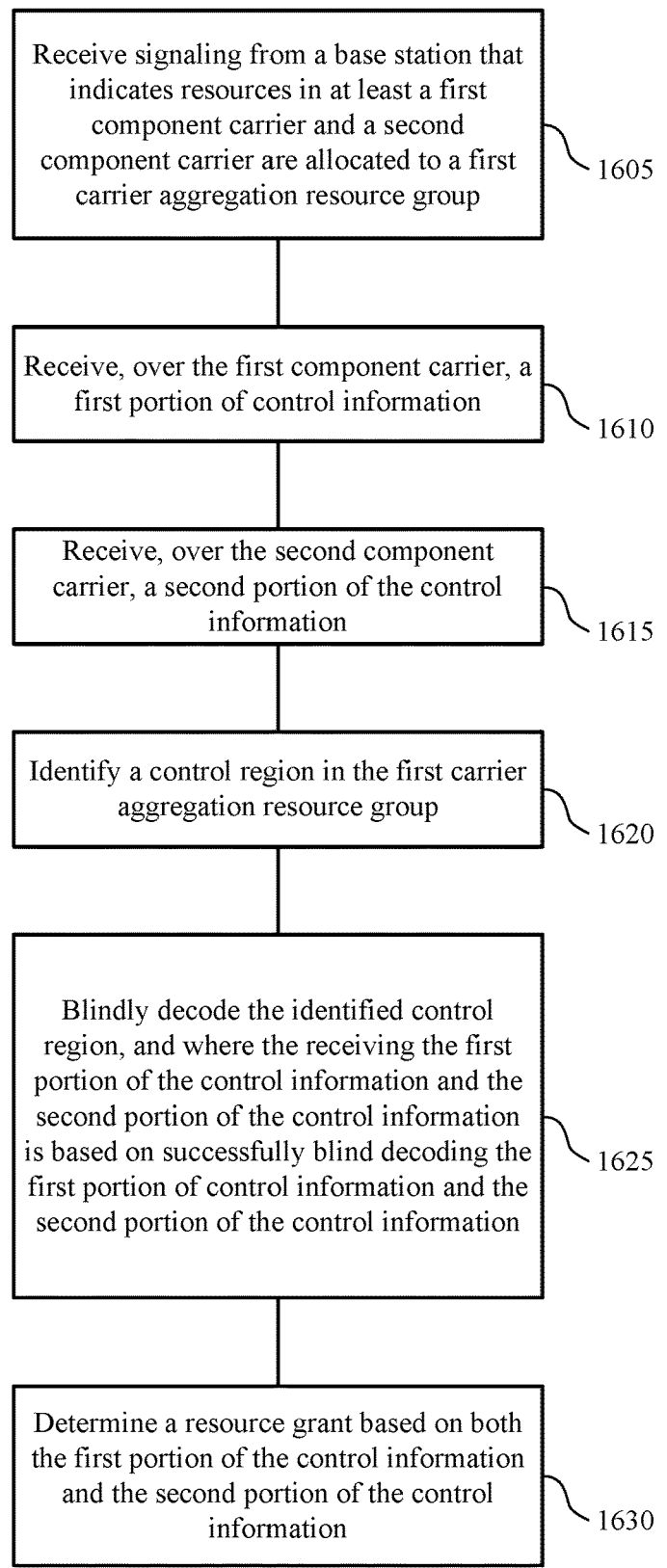

FIG. 16 shows a flowchart illustrating a method 1600 for downlink control allocation using carrier aggregation resource groups in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive signaling from a base station that indicates resources in at least a first component carrier and a second component carrier are allocated to a first carrier aggregation resource group. The operations of block 1605 may be performed according to the methods described herein. In certain examples, aspects of the operations of block 1605 may be performed by a CA resource group manager as described with reference to FIGS. 7 through 10.

At block 1610 the UE 115 may receive, over the first component carrier, a first portion of control information. The operations of block 1610 may be performed according to the methods described herein. In certain examples, aspects of the operations of block 1610 may be performed by a control information receiver as described with reference to FIGS. 7 through 10.

At block 1615 the UE 115 may receive, over the second component carrier, a second portion of the control information. The operations of block 1615 may be performed according to the methods described herein. In certain examples, aspects of the operations of block 1615 may be performed by a control information receiver as described with reference to FIGS. 7 through 10.

At block 1620 the UE 115 may identify a control region in the first carrier aggregation resource group. The operations of block 1620 may be performed according to the methods described herein. In certain examples, aspects of the operations of block 1620 may be performed by a CA resource group manager as described with reference to FIGS. 7 through 10.

At block 1625 the UE 115 may blindly decode the identified control region, and wherein the receiving the first portion of the control information and the second portion of the control information is based at least in part on successfully blind decoding the first portion of control information and the second portion of the control information. The operations of block 1625 may be performed according to the methods described herein. In certain examples, aspects of the operations of block 1625 may be performed by a control information receiver as described with reference to FIGS. 7 through 10.

At block 1630 the UE 115 may determine a resource grant based at least in part on the first portion of the control information and the second portion of the control information. In some cases, the resource grant may comprise an allocation of resources for shared channel transmission from one or more component carriers allocated to the first carrier aggregation resource group. The operations of block 1630 may be performed according to the methods described herein. In certain examples, aspects of the operations of block 1630 may be performed by a resource grant manager as described with reference to FIGS. 7 through 10.

Figure 17:
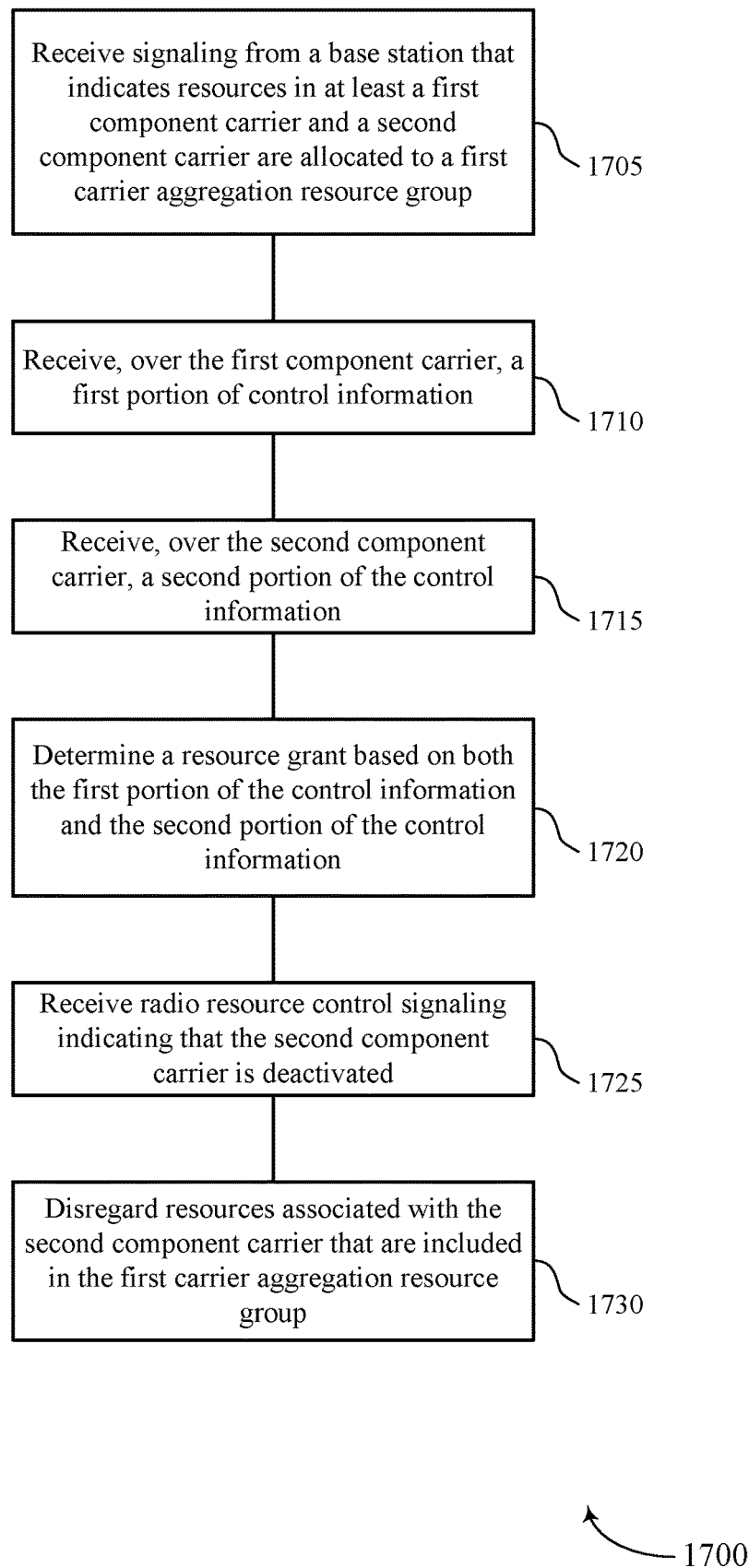

FIG. 17 shows a flowchart illustrating a method 1700 for downlink control allocation using carrier aggregation resource groups in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive signaling from a base station that indicates resources in at least a first component carrier and a second component carrier are allocated to a first carrier aggregation resource group. The operations of block 1705 may be performed according to the methods described herein. In certain examples, aspects of the operations of block 1705 may be performed by a CA resource group manager as described with reference to FIGS. 7 through 10.

At block 1710 the UE 115 may receive, over the first component carrier, a first portion of control information. The operations of block 1710 may be performed according to the methods described herein. In certain examples, aspects of the operations of block 1710 may be performed by a control information receiver as described with reference to FIGS. 7 through 10.

At block 1715 the UE 115 may receive, over the second component carrier, a second portion of the control information. The operations of block 1715 may be performed according to the methods described herein. In certain examples, aspects of the operations of block 1715 may be performed by a control information receiver as described with reference to FIGS. 7 through 10.

At block 1720 the UE 115 may determine a resource grant based at least in part on the first portion of the control information and the second portion of the control information. In some cases, the resource grant may comprise an allocation of resources for shared channel transmission from one or more component carriers allocated to the first carrier aggregation resource group. The operations of block 1720 may be performed according to the methods described herein. In certain examples, aspects of the operations of block 1720 may be performed by a resource grant manager as described with reference to FIGS. 7 through 10.

At block 1725 the UE 115 may receive radio resource control signaling indicating that the second component carrier is deactivated. The operations of block 1725 may be performed according to the methods described herein. In certain examples, aspects of the operations of block 1725 may be performed by a CA resource group manager as described with reference to FIGS. 7 through 10.

At block 1730 the UE 115 may disregard resources associated with the second component carrier that are included in the first carrier aggregation resource group. The operations of block 1730 may be performed according to the methods described herein. In certain examples, aspects of the operations of block 1730 may be performed by a CA resource group manager as described with reference to FIGS. 7 through 10.

Figure 18:
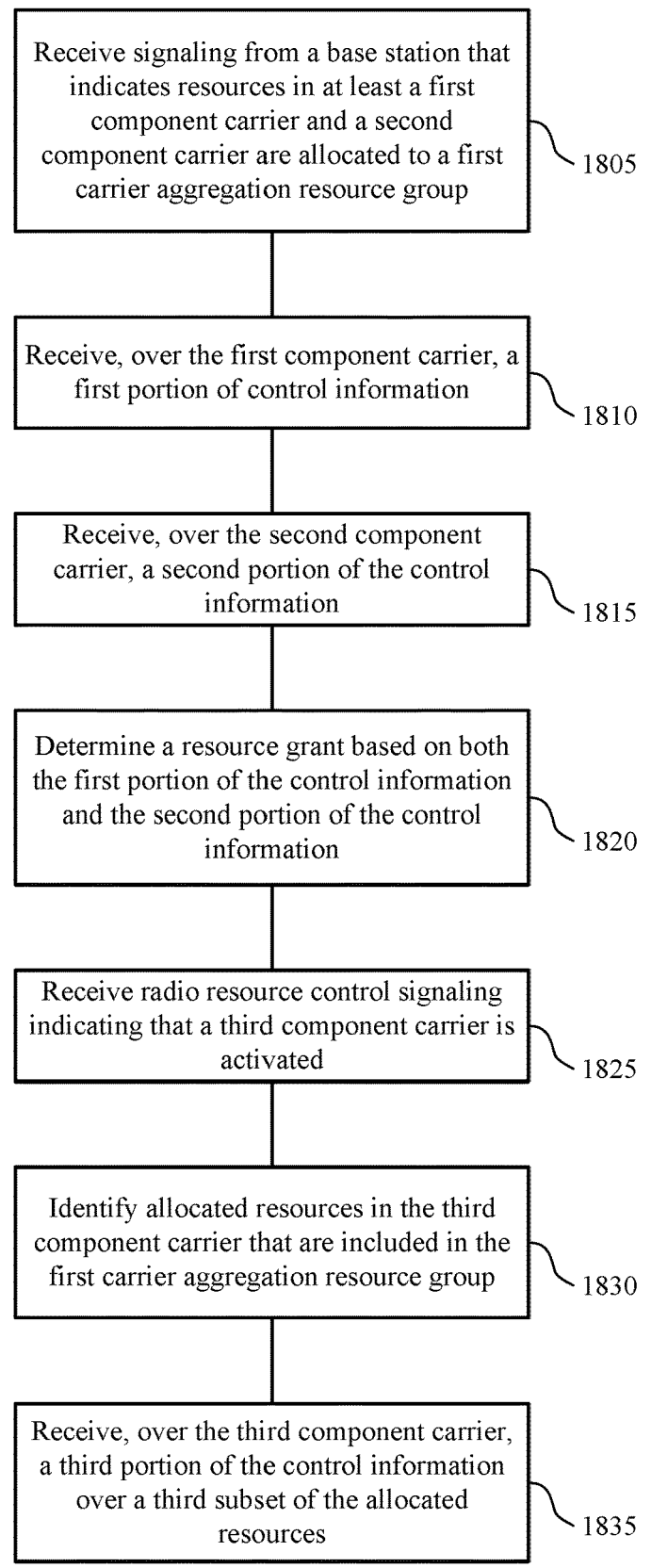

FIG. 18 shows a flowchart illustrating a method 1800 for downlink control allocation using carrier aggregation resource groups in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive signaling from a base station that indicates resources in at least a first component carrier and a second component carrier are allocated to a first carrier aggregation resource group. The operations of block 1805 may be performed according to the methods described herein. In certain examples, aspects of the operations of block 1805 may be performed by a CA resource group manager as described with reference to FIGS. 7 through 10.

At block 1810 the UE 115 may receive, over the first component carrier, a first portion of control information. The operations of block 1810 may be performed according to the methods described herein. In certain examples, aspects of the operations of block 1810 may be performed by a control information receiver as described with reference to FIGS. 7 through 10.

At block 1815 the UE 115 may receive, over the second component carrier, a second portion of the control information. The operations of block 1815 may be performed according to the methods described herein. In certain examples, aspects of the operations of block 1815 may be performed by a control information receiver as described with reference to FIGS. 7 through 10.

At block 1820 the UE 115 may determine a resource grant based at least in part on the first portion of the control information and the second portion of the control information. In some cases, the resource grant may comprise an allocation of resources for shared channel transmission from one or more component carriers allocated to the first carrier aggregation resource group. The operations of block 1820 may be performed according to the methods described herein. In certain examples, aspects of the operations of block 1820 may be performed by a resource grant manager as described with reference to FIGS. 7 through 10.

At block 1825 the UE 115 may receive radio resource control signaling indicating that a third component carrier is activated. The operations of block 1825 may be performed according to the methods described herein. In certain examples, aspects of the operations of block 1825 may be performed by a CA resource group manager as described with reference to FIGS. 7 through 10.

At block 1830 the UE 115 may identify allocated resources in the third component carrier that are included in the first carrier aggregation resource group. The operations of block 1830 may be performed according to the methods described herein. In certain examples, aspects of the operations of block 1830 may be performed by a CA resource group manager as described with reference to FIGS. 7 through 10.

At block 1835 the UE 115 may receive, over the third component carrier, a third portion of the control information over a third subset of the allocated resources. The operations of block 1835 may be performed according to the methods described herein. In certain examples, aspects of the operations of block 1835 may be performed by a CA resource group manager as described with reference to FIGS. 7 through 10.

Figure 19:
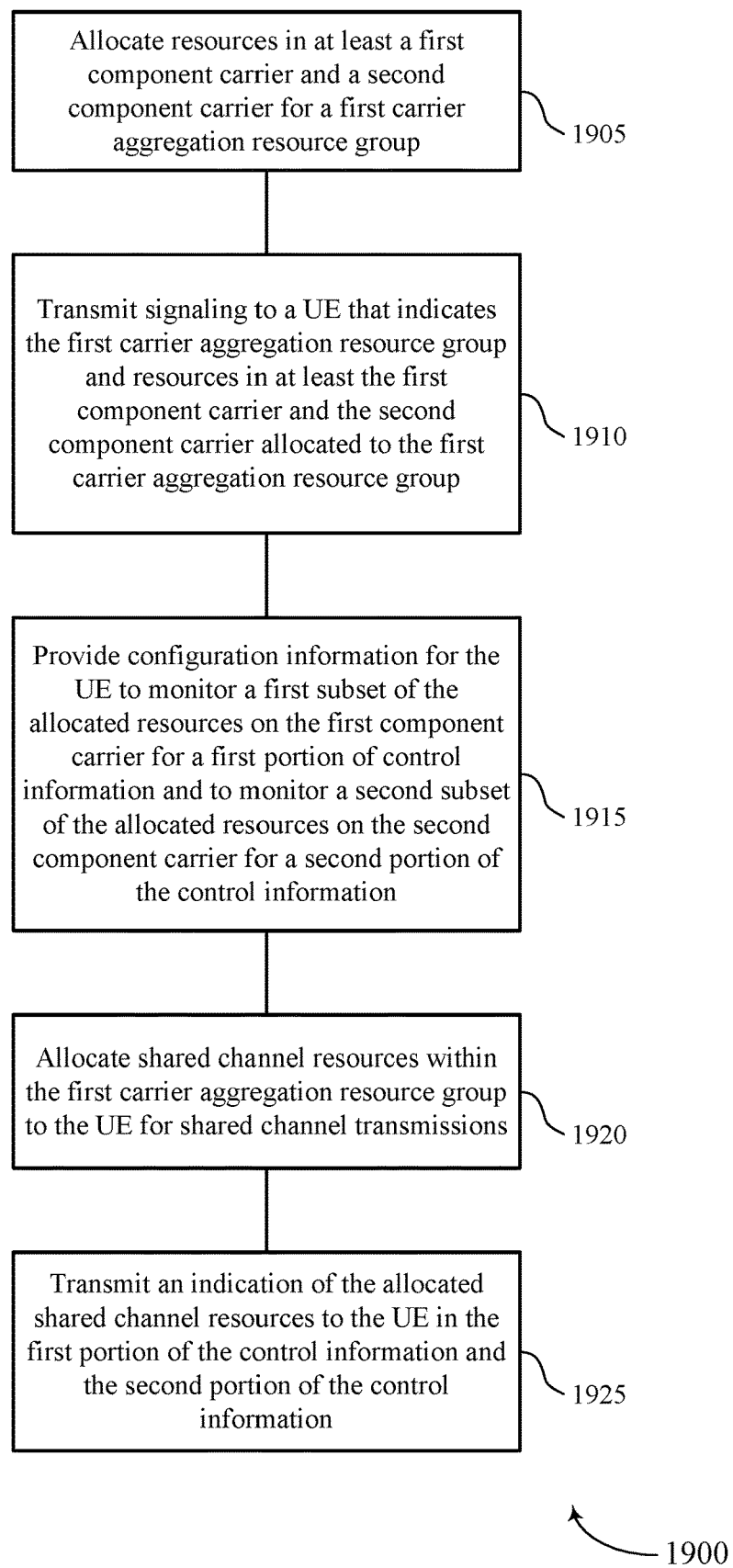

FIG. 19 shows a flowchart illustrating a method 1900 for downlink control allocation using carrier aggregation resource groups in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may allocate resources in at least a first component carrier and a second component carrier for a first carrier aggregation resource group. The operations of block 1905 may be performed according to the methods described herein. In certain examples, aspects of the operations of block 1905 may be performed by a CA resource group manager as described with reference to FIGS. 11 through 14.

At block 1910 the base station 105 may transmit signaling to a user equipment (UE) that indicates the first carrier aggregation resource group and resources in at least the first component carrier and the second component carrier allocated to the first carrier aggregation resource group. The operations of block 1910 may be performed according to the methods described herein. In certain examples, aspects of the operations of block 1910 may be performed by a resource group configuration component as described with reference to FIGS. 11 through 14.

At block 1915 the base station 105 may provide configuration information for the UE to monitor a first subset of the allocated resources on the first component carrier for a first portion of control information and to monitor a second subset of the allocated resources on the second component carrier for a second portion of the control information. In some examples, the base station may determine a channel condition or error rate associated with the first component carrier. Rather than providing configuration information for the UE to monitor control information on a single component carrier, the base station may provide configuration information for the UE to monitor the first subset of the allocated resources on the first component carrier for the first portion of control information and to monitor the second subset of the allocated resources on the second component carrier for the second portion of the control information based at least in part the determining the channel condition or error rate. The operations of block 1915 may be performed according to the methods described herein. In certain examples, aspects of the operations of block 1915 may be performed by a resource group configuration component as described with reference to FIGS. 11 through 14.

At block 1920 the base station 105 may allocate shared channel resources within the carrier aggregation resource group to the UE for shared channel transmissions. The operations of block 1920 may be performed according to the methods described herein. In certain examples, aspects of the operations of block 1920 may be performed by a resource allocation component as described with reference to FIGS. 11 through 14.

At block 1925 the base station 105 may transmit an indication of the allocated shared channel resources to the UE in the first portion of the control information and the second portion of the control information. The operations of block 1925 may be performed according to the methods described herein. In certain examples, aspects of the operations of block 1925 may be performed by a resource allocation component as described with reference to FIGS. 11 through 14.

Figure 20:
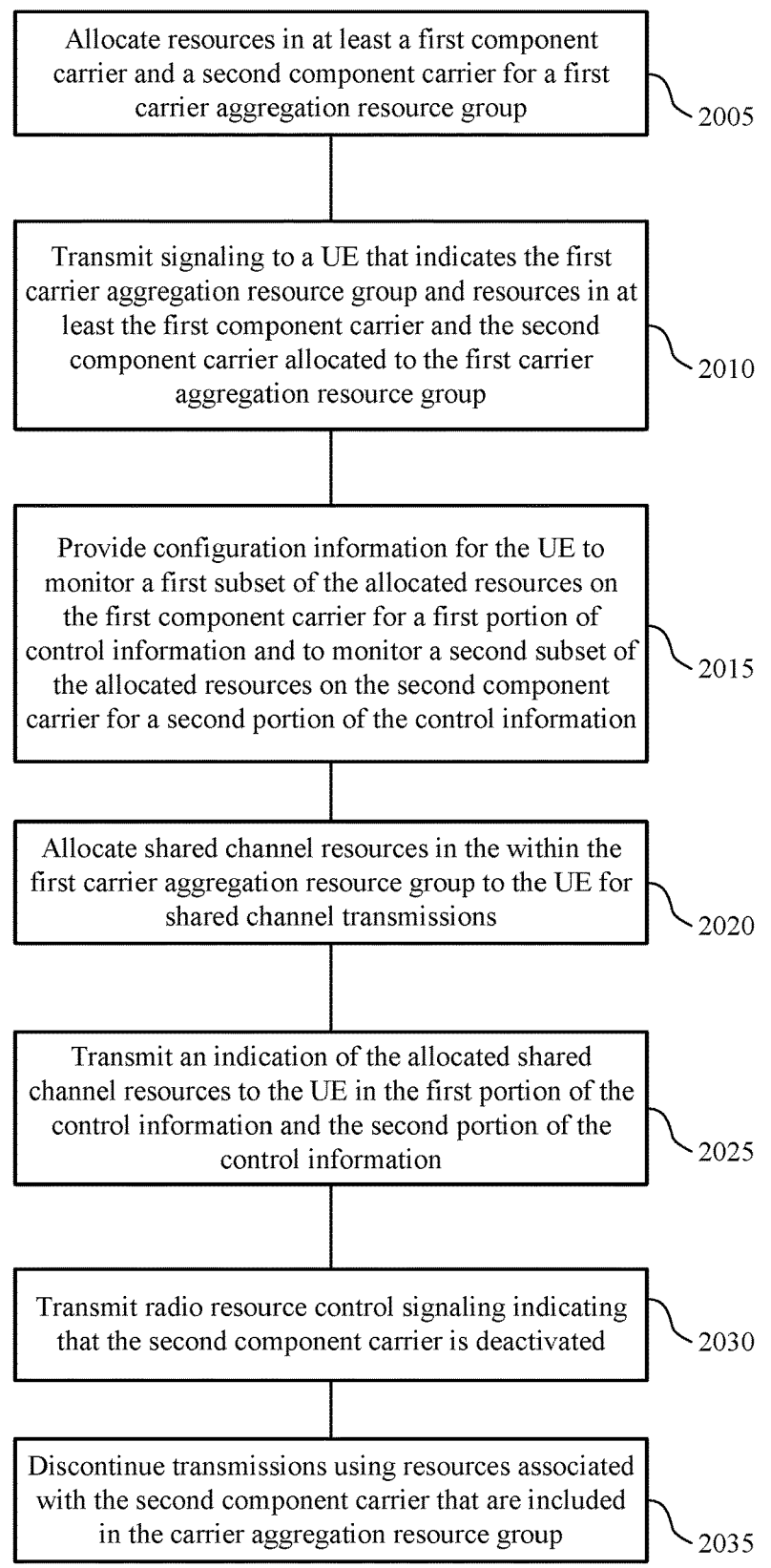

FIG. 20 shows a flowchart illustrating a method 2000 for downlink control allocation using carrier aggregation resource groups in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may allocate resources in at least a first component carrier and a second component carrier for a first carrier aggregation resource group. The operations of block 2005 may be performed according to the methods described herein. In certain examples, aspects of the operations of block 2005 may be performed by a CA resource group manager as described with reference to FIGS. 11 through 14.

At block 2010 the base station 105 may transmit signaling to a user equipment (UE) that indicates the first carrier aggregation resource group and resources in at least the first component carrier and the second component carrier allocated to the first carrier aggregation resource group. The operations of block 2010 may be performed according to the methods described herein. In certain examples, aspects of the operations of block 2010 may be performed by a resource group configuration component as described with reference to FIGS. 11 through 14.

At block 2015 the base station 105 may provide configuration information for the UE to monitor a first subset of the allocated resources on the first component carrier for a first portion of control information and to monitor a second subset of the allocated resources on the second component carrier for a second portion of the control information. The operations of block 2015 may be performed according to the methods described herein. In certain examples, aspects of the operations of block 2015 may be performed by a resource group configuration component as described with reference to FIGS. 11 through 14.

At block 2020 the base station 105 may allocate shared channel resources within the carrier aggregation resource group to the UE for shared channel transmissions. The operations of block 2020 may be performed according to the methods described herein. In certain examples, aspects of the operations of block 2020 may be performed by a resource allocation component as described with reference to FIGS. 11 through 14.

At block 2025 the base station 105 may transmit an indication of the allocated shared channel resources to the UE in the first portion of the control information and the second portion of the control information. The operations of block 2025 may be performed according to the methods described herein. In certain examples, aspects of the operations of block 2025 may be performed by a resource allocation component as described with reference to FIGS. 11 through 14.

At block 2030 the base station 105 may transmit radio resource control signaling indicating that the second component carrier is deactivated. The operations of block 2030 may be performed according to the methods described herein. In certain examples, aspects of the operations of block 2030 may be performed by a resource group configuration component as described with reference to FIGS. 11 through 14.

At block 2035 the base station 105 may discontinue transmissions using resources associated with the second component carrier that are included in the carrier aggregation resource group. The operations of block 2035 may be performed according to the methods described herein. In certain examples, aspects of the operations of block 2035 may be performed by a resource group configuration component as described with reference to FIGS. 11 through 14.

Figure 21:
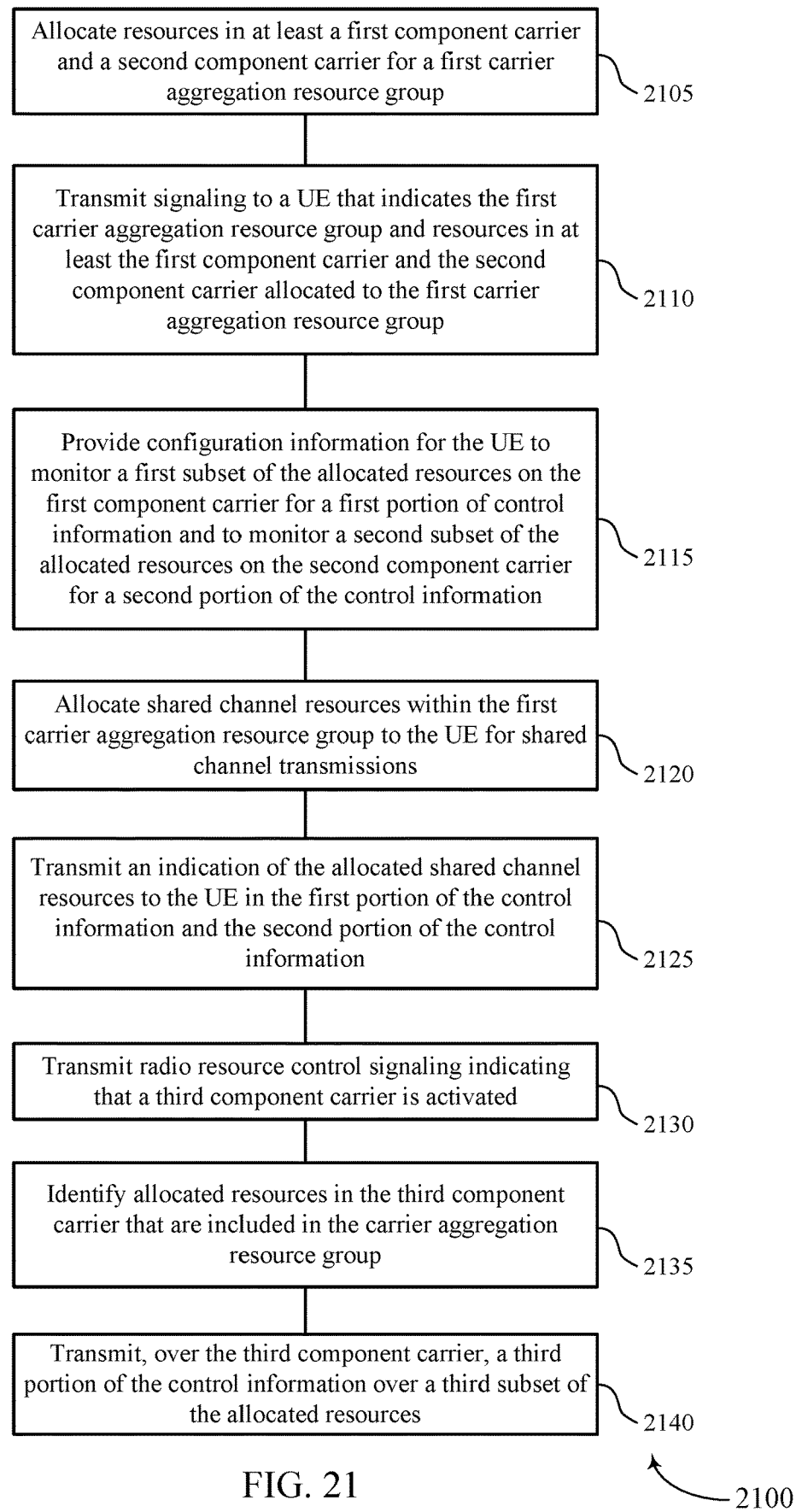

FIG. 21 shows a flowchart illustrating a method 2100 for downlink control allocation using carrier aggregation resource groups in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may allocate resources in at least a first component carrier and a second component carrier for a first carrier aggregation resource group. The operations of block 2105 may be performed according to the methods described herein. In certain examples, aspects of the operations of block 2105 may be performed by a CA resource group manager as described with reference to FIGS. 11 through 14.

At block 2110 the base station 105 may transmit signaling to a user equipment (UE) that indicates the first carrier aggregation resource group and resources in at least the first component carrier and the second component carrier allocated to the first carrier aggregation resource group. The operations of block 2110 may be performed according to the methods described herein. In certain examples, aspects of the operations of block 2110 may be performed by a resource group configuration component as described with reference to FIGS. 11 through 14.

At block 2115 the base station 105 may provide configuration information for the UE to monitor a first subset of the allocated resources on the first component carrier for a first portion of control information and to monitor a second subset of the allocated resources on the second component carrier for a second portion of the control information. The operations of block 2115 may be performed according to the methods described herein. In certain examples, aspects of the operations of block 2115 may be performed by a resource group configuration component as described with reference to FIGS. 11 through 14.

At block 2120 the base station 105 may allocate shared channel resources within the carrier aggregation resource group to the UE for shared channel transmissions. The operations of block 2120 may be performed according to the methods described herein. In certain examples, aspects of the operations of block 2120 may be performed by a resource allocation component as described with reference to FIGS. 11 through 14.

At block 2125 the base station 105 may transmit an indication of the allocated shared channel resources to the UE in the first portion of the control information and the second portion of the control information. The operations of block 2125 may be performed according to the methods described herein. In certain examples, aspects of the operations of block 2125 may be performed by a resource allocation component as described with reference to FIGS. 11 through 14.

At block 2130 the base station 105 may transmit radio resource control signaling indicating that a third component carrier is activated. The operations of block 2130 may be performed according to the methods described herein. In certain examples, aspects of the operations of block 2130 may be performed by a resource group configuration component as described with reference to FIGS. 11 through 14.

At block 2135 the base station 105 may identify allocated resources in the third component carrier that are included in the carrier aggregation resource group. The operations of block 2135 may be performed according to the methods described herein. In certain examples, aspects of the operations of block 2135 may be performed by a resource group configuration component as described with reference to FIGS. 11 through 14.

At block 2140 the base station 105 may transmit, over the third component carrier, a third portion of the control information over a third subset of the allocated resources. The operations of block 2140 may be performed according to the methods described herein. In certain examples, aspects of the operations of block 2140 may be performed by a resource group configuration component as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving signaling from a base station that indicates resources in at least a first component carrier and a second component carrier are allocated to a first carrier aggregation resource group;
receiving, over the first component carrier, a first portion of control information;
receiving, over the second component carrier, a second portion of the control information, wherein a combination of the first portion of the control information and the second portion of the control information comprises a downlink grant and information pertaining to an uplink grant; and
determining a resource grant based at least in part on the combination of the first portion of the control information and the second portion of the control information, wherein the resource grant comprises an allocation of resources for shared channel transmission from a first one or more component carriers allocated to the first carrier aggregation resource group and from a second one or more component carriers allocated to a second carrier aggregation resource group different than the first carrier aggregation resource group.

2. The method of claim 1, further comprising:
identifying a control region in the first carrier aggregation resource group; and
blindly decoding the identified control region, and wherein the receiving the first portion of the control information and the second portion of the control information is based at least in part on successfully blind decoding the first portion of control information and the second portion of the control information.

3. The method of claim 1, wherein:
the determining the resource grant comprises identifying a shared channel resource allocation of at least the first component carrier and the second component carrier allocated to the first carrier aggregation resource group.

4. The method of claim 1, wherein:
the signaling from the base station indicates that the first carrier aggregation resource group and the second carrier aggregation resource group are to be monitored for the control information, and the resource grant indicates that shared channel resources are allocated in the first carrier aggregation resource group, the second carrier aggregation resource group, and a third carrier aggregation resource group.

5. The method of claim 1, wherein:
the resource grant comprises one or more aggregation bits that indicate that shared channel transmissions in at least the first carrier aggregation resource group and the second carrier aggregation resource group are to be aggregated; and
the second carrier aggregation resource group comprises at least one component carrier in common with the first carrier aggregation resource group and at least one component carrier that is not allocated to the first carrier aggregation resource group.

6. The method of claim 1, wherein:
the signaling from the base station is radio resource control (RRC) signaling.

7. The method of claim 1, wherein:
the first carrier aggregation resource group comprises a first block of resources from the first component carrier;
the first portion of control information comprises a first subset of resources of the first block of resources, and a second block of resources from the second component carrier; and
the second portion of control information comprises a second subset of resources of the second block of resources.

8. The method of claim 1, wherein:
the allocation of resources for shared channel transmission comprises resources from the first component carrier; and the first portion of the control information comprises a subset of resources that are localized or distributed within the allocation of resources for shared channel transmission resources.

9. The method of claim 1, wherein:
one or more of the first portion of the control information or the second portion of the control information includes a downlink control information portion; and
one or more rate-matching bits in the downlink control information portion indicate that all or a portion of resources allocated for control channel transmissions are to be reused for shared channel transmissions.

10. The method of claim 9, wherein:
the first portion of the control information and the second portion of the control information are aggregated according to a control region size of the first component carrier and the second component carrier.

11. The method of claim 1, further comprising:
receiving radio resource control (RRC) signaling, the RRC signaling indicating that the second component carrier is deactivated; and
disregarding resources in the second component carrier that are included in the first carrier aggregation resource group.

12. The method of claim 1, further comprising:
receiving radio resource control (RRC) signaling, the RRC signaling indicating that a third component carrier is activated and that resources in the third component carrier are included in the first carrier aggregation resource group;
identifying resources in the third component carrier that are indicated as included in the first carrier aggregation resource group; and
receiving, over the third component carrier, a third portion of the control information over a third subset of the identified resources.

13. A method for wireless communication, comprising:
allocating resources in at least a first component carrier and a second component carrier for a first carrier aggregation resource group;
transmitting signaling to a user equipment (UE) that indicates the first carrier aggregation resource group and resources in at least the first component carrier and the second component carrier allocated to the first carrier aggregation resource group;
providing configuration information for the UE to monitor a first subset of the allocated resources on the first component carrier for a first portion of control information and to monitor a second subset of the allocated resources on the second component carrier for a second portion of the control information, wherein a combination of the first portion of the control information and the second portion of the control information comprises a downlink grant and information pertaining to an uplink grant;
allocating shared channel resources within the first carrier aggregation resource group and a second carrier aggregation resource group different than the first carrier aggregation resource group to the UE for shared channel transmissions; and
transmitting an indication of the allocated shared channel resources to the UE in the first portion of the control information and the second portion of the control information.

14. The method of claim 13, wherein:
the signaling identifies a control region in each of the first component carrier and the second component carrier for blind decoding at the UE.

15. The method of claim 13, wherein:
the allocated shared channel resources comprise shared channel resource allocations in two or more carrier aggregation resource groups.

16. The method of claim 13, wherein:
the signaling indicates the first carrier aggregation resource group and the second carrier aggregation resource group are to be monitored for control information, and the allocated shared channel resources are allocated in the first carrier aggregation resource group, the second carrier aggregation resource group, and a third carrier aggregation resource group.

17. The method of claim 13, wherein:
the signaling comprises one or more aggregation bits that indicate that shared channel transmissions in two or more carrier aggregation resource groups are to be aggregated.

18. The method of claim 13, further comprising:
determining a channel condition or error rate associated with the first component carrier, and wherein the providing configuration information for the UE to monitor the first subset of the allocated resources on the first component carrier for the first portion of control information and to monitor the second subset of the allocated resources on the second component carrier for the second portion of the control information is based at least in part the determining the channel condition or error rate.

19. The method of claim 13, wherein:
the first carrier aggregation resource group comprises: a first block of resources from the first component carrier;
the first portion of control information comprises a first subset of resources of the first block of resources, and a second block of resources from the second component carrier; and
the second portion of control information comprises a second subset of resources of the second block of resources.

20. The method of claim 13, wherein:
the allocated resources for shared channel transmission comprises resources from the first component carrier; and
the first portion of the control information comprises a subset of resources that are localized or distributed within the allocated resources for shared channel transmission resources.

21. The method of claim 13, wherein:
one or more of the first portion of the control information or the second portion of the control information includes a downlink control information portion; and
one or more rate-matching bits in the downlink control information portion indicate that all or a portion of resources allocated for control channel transmissions are to be reused for shared channel transmissions.

22. The method of claim 21, wherein:
the first portion of the control information and the second portion of the control information are aggregated according to a control region size of the first component carrier and the second component carrier.

23. The method of claim 13, further comprising:
transmitting radio resource control (RRC) signaling, the RRC signaling indicating that the second component carrier is deactivated; and
discontinuing transmissions using resources in the second component carrier that are included in the first carrier aggregation resource group.

24. The method of claim 13, further comprising:
transmitting radio resource control (RRC) signaling, the RRC signaling indicating that a third component carrier is activated and that resources in the third component carrier are to be included in the first carrier aggregation resource group;
identifying resources in the third component carrier that are to be included in the first carrier aggregation resource group; and
transmitting, over the third component carrier, a third portion of the control information over a third subset of the identified resources.

25. An apparatus for wireless communication, comprising:
means for receiving signaling from a base station that indicates resources in at least a first component carrier and a second component carrier are allocated to a first carrier aggregation resource group;
means for receiving, over the first component carrier, a first portion of control information;
means for receiving, over the second component carrier, a second portion of the control information, wherein a combination of the first portion of the control information and the second portion of the control information comprises a downlink grant and information pertaining to an uplink grant; and
means for determining a resource grant based at least in part on the combination of the first portion of the control information and the second portion of the control information, wherein the resource grant comprises an allocation of resources for shared channel transmission from a first one or more component carriers allocated to the first carrier aggregation resource group and from a second one or more component carriers allocated to a second carrier aggregation resource group different than the first carrier aggregation resource group.

26. An apparatus for wireless communication, comprising:
means for allocating resources in at least a first component carrier and a second component carrier for a first carrier aggregation resource group;
means for transmitting signaling to a user equipment (UE) that indicates the first carrier aggregation resource group and resources in at least the first component carrier and the second component carrier allocated to the first carrier aggregation resource group;
means for providing configuration information for the UE to monitor a first subset of the allocated resources on the first component carrier for a first portion of control information and to monitor a second subset of the allocated resources on the second component carrier for a second portion of the control information, wherein a combination of the first portion of the control information and the second portion of the control information comprises a downlink grant and information pertaining to an uplink grant;
means for allocating shared channel resources within the first carrier aggregation resource group and a second carrier aggregation resource group different than the first carrier aggregation resource group to the UE for shared channel transmissions; and
means for transmitting an indication of the allocated shared channel resources to the UE in the first portion of the control information and the second portion of the control information.

27. An apparatus for wireless communication, comprising:
a processor;
memory coupled with the processor; and
instructions stored in the memory and operable, when executed by the processor, to cause the apparatus to:
receive signaling from a base station that indicates resources in at least a first component carrier and a second component carrier are allocated to a first carrier aggregation resource group;
receive, over the first component carrier, a first portion of control information;
receive, over the second component carrier, a second portion of the control information, wherein a combination of the first portion of the control information and the second portion of the control information comprises a downlink grant and information pertaining to an uplink grant; and
determine a resource grant based at least in part on the combination of the first portion of the control information and the second portion of the control information, wherein the resource grant comprises an allocation of resources for shared channel transmission from a first one or more component carriers allocated to the first carrier aggregation resource group and from a second one or more component carriers allocated to a second carrier aggregation resource group different than the first carrier aggregation resource group.

28. An apparatus for wireless communication, comprising:
a processor;
memory coupled with the processor; and
instructions stored in the memory and operable, when executed by the processor, to cause the apparatus to:
allocate resources in at least a first component carrier and a second component carrier for a first carrier aggregation resource group;
transmit signaling to a user equipment (UE) that indicates the first carrier aggregation resource group and resources in at least the first component carrier and the second component carrier allocated to the first carrier aggregation resource group;
provide configuration information for the UE to monitor a first subset of the allocated resources on the first component carrier for a first portion of control information and to monitor a second subset of the allocated resources on the second component carrier for a second portion of the control information, wherein a combination of the first portion of the control information and the second portion of the control information comprises a downlink grant and information pertaining to an uplink grant;
allocate shared channel resources within the first carrier aggregation resource group and a second carrier aggregation resource group different than the first carrier aggregation resource group to the UE for shared channel transmissions; and transmit an indication of the allocated shared channel resources to the UE in the first portion of the control information and the second portion of the control information.

29. A non-transitory computer readable medium storing code for wireless communication, the code comprising instructions executable by a processor to:
receive signaling from a base station that indicates resources in at least a first component carrier and a second component carrier are allocated to a first carrier aggregation resource group;
receive, over the first component carrier, a first portion of control information;
receive, over the second component carrier, a second portion of the control information, wherein a combination of the first portion of the control information and the second portion of the control information comprises a downlink grant and information pertaining to an uplink grant; and
determine a resource grant based at least in part on the combination of the first portion of the control information and the second portion of the control information, wherein the resource grant comprises an allocation of resources for shared channel transmission from a first one or more component carriers allocated to the first carrier aggregation resource group and from a second one or more component carriers allocated to a second carrier aggregation resource group different than the first carrier aggregation resource group.

30. A non-transitory computer readable medium storing code for wireless communication, the code comprising instructions executable by a processor to:
allocate resources in at least a first component carrier and a second component carrier for a first carrier aggregation resource group;
transmit signaling to a user equipment (UE) that indicates the first carrier aggregation resource group and resources in at least the first component carrier and the second component carrier allocated to the first carrier aggregation resource group;
provide configuration information for the UE to monitor a first subset of the allocated resources on the first component carrier for a first portion of control information and to monitor a second subset of the allocated resources on the second component carrier for a second portion of the control information, wherein a combination of the first portion of the control information and the second portion of the control information comprises a downlink grant and information pertaining to an uplink grant; and
allocate shared channel resources within the first carrier aggregation resource group and a second carrier aggregation resource group different than the first carrier aggregation resource group to the UE for shared channel transmissions; and
transmit an indication of the allocated shared channel resources to the UE in the first portion of the control information and the second portion of the control information.

* * * * *